(12) United States Patent
Bauder et al.

(10) Patent No.: US 8,366,926 B2
(45) Date of Patent: Feb. 5, 2013

(54) METHOD FOR WASTEWATER TREATMENT

(75) Inventors: Rainer Bauder, Nahant, MA (US);
Richard Hsu Yeh, Taipei (TW)

(73) Assignee: Hydroionic Technologies Co., Ltd., Taipei (TW)

( * ) Notice: Subject to any disclaimer, the term of this patent is extended or adjusted under 35 U.S.C. 154(b) by 340 days.

(21) Appl. No.: 12/630,182

(22) Filed: Dec. 3, 2009

(65) Prior Publication Data
US 2010/0166626 A1 Jul. 1, 2010

Related U.S. Application Data

(60) Provisional application No. 61/119,567, filed on Dec. 3, 2008.

(51) Int. Cl.
*B01D 35/00* (2006.01)
(52) U.S. Cl. ......................... 210/205; 210/489
(58) Field of Classification Search .................. 210/205, 210/489
See application file for complete search history.

(56) References Cited

U.S. PATENT DOCUMENTS

| | | | |
|---|---|---|---|
| 2,698,293 A | 12/1954 | Klumb | |
| 2,754,261 A | 7/1956 | Akeroyd | |
| 3,215,624 A | 11/1965 | Frazer et al. | |
| 3,943,233 A | 3/1976 | Swanson et al. | |
| 4,048,284 A | 9/1977 | Horton et al. | |
| 4,176,060 A | 11/1979 | Sury et al. | |
| 4,210,530 A | 7/1980 | Etzel et al. | |
| 4,395,335 A * | 7/1983 | Saito | 210/675 |
| 4,908,136 A | 3/1990 | Chou et al. | |
| 5,045,115 A | 9/1991 | Gmunder et al. | |
| 5,310,486 A | 5/1994 | Green et al. | |
| 5,366,634 A | 11/1994 | Vijayan et al. | |
| 5,376,265 A | 12/1994 | Szabo | |
| 5,571,419 A | 11/1996 | Obata et al. | |
| 5,624,881 A | 4/1997 | Tavlarides et al. | |
| 5,759,826 A * | 6/1998 | Ahlers et al. | 435/136 |
| 5,785,863 A | 7/1998 | Varner, Jr. et al. | |
| 5,804,606 A | 9/1998 | Surowiec et al. | |
| 5,858,119 A | 1/1999 | Mayne | |
| 5,932,182 A | 8/1999 | Blaney | |
| 6,875,323 B2 | 4/2005 | Yaita et al. | |
| 6,878,286 B2 | 4/2005 | Jensen et al. | |
| 7,383,195 B2 | 6/2008 | Mallett et al. | |
| 2005/0194319 A1 * | 9/2005 | Wegner | 210/670 |
| 2005/0218077 A1 | 10/2005 | Brunsell | |

(Continued)

OTHER PUBLICATIONS

International Search Report with Written Opinion, dated Jan. 26, 2010, received in international patent application No. PCT/US09/66544, 8 pgs.
International Search Report with Written Opinion, dated Jan. 27, 2010, received in international patent application No. PCT/US09/66543, 8 pgs.

(Continued)

*Primary Examiner* — Chester Barry
(74) *Attorney, Agent, or Firm* — Holland & Knight LLP; Brian J. Colandreo, Esq.; Mark H. Whittenberger, Esq.

(57) ABSTRACT

The present disclosure is directed towards systems and methods for the treatment of wastewater. A system in accordance with one particular embodiment may include a vacuum filter band system configured to receive a saturated resin tank from a front end system, the vacuum filter band system configured to generate a slurry from the saturated resin tank and to provide a cascading resin rinse to the slurry. The system may further include a repetitive stripping system configured to receive a metal-filled purification unit from a metal specific purification system. The repetitive stripping system may be further configured to sequentially apply the contents of a plurality of acid tanks to the metal-filled purification unit to generate a metal salt. Numerous other embodiments are also within the scope of the present disclosure.

14 Claims, 15 Drawing Sheets

U.S. PATENT DOCUMENTS

| | | | |
|---|---|---|---|
| 2006/0189833 A1* | 8/2006 | Powell et al. ............... 568/620 |
| 2006/0283803 A1 | 12/2006 | Nguyen et al. |
| 2007/0029260 A1 | 2/2007 | Wismer et al. |
| 2007/0163958 A1 | 7/2007 | Newcombe et al. |
| 2007/0297960 A1 | 12/2007 | Krebs |
| 2008/0116136 A1* | 5/2008 | Wilkins et al. ............... 210/650 |
| 2010/0163489 A1 | 7/2010 | Bauder et al. |
| 2010/0163491 A1 | 7/2010 | Bauder et al. |
| 2010/0163497 A1 | 7/2010 | Bauder et al. |
| 2010/0166625 A1 | 7/2010 | Bauder et al. |
| 2010/0170853 A1 | 7/2010 | Bauder et al. |

OTHER PUBLICATIONS

International Search Report with Written Opinion, dated Jan. 27, 2010, received in international patent application No. PCT/US09/66581, 10 pgs.

International Search Report with Written Opinion, dated Sep. 27, 2010, received in International Patent Application No. PCT/IB2009/008065, 5 pgs.

International Search Report with Written Opinion, dated May 14, 2010, received in international patent application No. PCT/IB2009/07755, 8 pgs.

* cited by examiner

METHOD FOR WASTEWATER TREATMENT

RELATED APPLICATIONS

This application claims the priority of the following application, which is herein incorporated by reference: U.S. Provisional Application No. 61/119,567; filed 3 Dec. 2008, entitled: "Ion Exchange Based Metal Bearing Wastewater Treatment and Recycling System Therefore".

TECHNICAL FIELD

This disclosure generally relates to the field of industrial wastewater treatment of metal bearing wastes. More specifically, the present disclosure relates to the equipment, operating procedures, chemical processes, and physical processes employed to remove regulated and non regulated contaminants from industrial wastewater.

BACKGROUND

Many industrial manufacturing processes generate wastewater containing metals and other contaminants; both organic and non-organic. Due to their inherent toxicity, regulatory authorities place strict limits on the maximum concentration of certain metals that can be legally discharged into the environment. In order to comply with these regulations, factories employ wastewater treatment processes to remove regulated substances from the wastewater. The two principal wastewater treatment methods are chemical precipitation and ion exchange.

Chemical precipitation is the most commonly used method today to remove dissolved (ionic) metals from wastewater. Chemical precipitation typically requires process operations of neutralization, precipitation, coagulation, flocculation, sedimentation, settling/filtration, and dewatering. It uses a series of tanks in which coagulants, precipitants and other chemicals such as polymers, ferrous sulfate, sodium hydroxide, lime, and poly aluminum chloride are added to convert metals into an insoluble form. In conjunction with adjusting the pH of the wastewater, this causes the metals to precipitate out of the water. Using a clarifying tank, the precipitates are allowed to settle, and then are collected as sludge; filtration can also be used to remove the solids. Excess water in the sludge is removed using filter presses and/or dryers. The sludge, which itself is a regulated hazardous waste, is then sent offsite where it is stabilized by mixing with cement or polymers, and then buried in a hazardous material landfill. In this fashion the concentrations of the regulated metals in the wastewater are reduced to a level in compliance with regulatory limits, allowing the water to be discharged from the facility. However, the need to handle, transport, and dispose of the resulting hazardous sludges is one of the most costly, labor intensive, resource demanding and difficult problems with chemical precipitation as a wastewater treatment.

The inherent disadvantage of chemical precipitation is that it is an active and additive process and, as such, requires that chemicals be added to the wastewater in order to remove regulated metals. The side effect of this is an increase in the concentrations of many other substances, as well as a deterioration in characteristics such as chemical oxygen demand (COD) and conductivity; thus requiring additional treatments and rendering the water unsuitable or uneconomical for recycling and reuse. Furthermore, the metals removed are not only unrecoverable, they are rendered into a regulated hazardous material requiring specialized disposal. As an additive process, chemical precipitation also increases, by orders of magnitude, the mass of waste material which needs to be handled, transported and landfilled.

As an active process, the effectiveness of chemical precipitation is predicated on the proper operational procedures and dosing of chemicals relative to fluctuating variables such as the number of metals in solution and their concentrations, as well as the presence and concentration of other substances. Underdosing of chemicals results in incomplete precipitation and removal of regulated metals, while overdosing wastes chemicals, generates additional volumes of sludge, and increases cost. Currently, due to the consequences of illegal discharges, most wastewater treatment operations simply absorb the additional cost and overdose the chemicals in their treatment operations. Also, as each metal optimally precipitates at a different pH, in wastewaters containing several metals, adjusting pH to precipitate one metal may actually cause another metal to resolubilize into the wastewater. Lastly, chemical precipitation processes require a large amount of floor space and capital equipment.

In contrast, ion exchange is a stoichiometrical, reversible, electrostatic chemical reaction in which an ion in solution is exchanged for a similarly charged ion in a complex. These complexes are typically chemically bound to a solid, insoluble, organic polymer substrate creating a resin; the most common of which is crosslinked polystyrene. Also, inorganic substrates like silica gel in various porosities and chemical modifications can be employed. Polystyrene crosslinking is achieved by adding divinyl benzene to the styrene which increases stability, but does slightly reduce exchange capacity. With a macro porous structure, these ion exchange resins are normally produced in the form of small (1 mm) beads, thus providing a very high and accessible surface area for the binding of the functional group complexes; the site where the ion exchange reaction actually occurs. The exchange capacity of the resin is defined by the total number of exchange sites, or more specifically, of its total available functional groups.

In the actual ion exchange reaction, an ion such as sodium ($Na+$) loosely attached to a functional group of the complex is exchanged for an ion in solution such as copper ($Cu2+$); that is, the sodium ions detach from the complex and go into solution while the copper ion comes out of solution and takes the place of the sodium ions on the complex. There are two types of ion exchange resins, cation exchangers, which exchange their positively charged ions ($H+$, $Na+$ etc.) for similarly charged ions ($Cu2+$, $Ni2+$, etc.) in solution, and anion exchangers, which exchange their negatively charged ions ($OH-$) for similarly charged ions in solution (chlorides, sulfates, etc.)

Ion exchange resins can also be selective or nonselective, based on the configuration and chemical structure of their functional groups. Non selective resins exhibit very similar affinities for all similarly charged ions, and consequently will attract and exchange all species without significant preference. Selective resins have specialized functional groups which exhibit different affinities to different ions of similar charge, causing them to attract and exchange ions with species in a well defined order of preference. The ion that is originally attached to the resin (e.g., $H+$, $Na+$, $OH-$) is of the lowest affinity, which is why it will exchange places with any other ion the resin encounters. Generally speaking, the relative affinity a resin exhibits for a particular ion is directly correlated to the exchange efficiency and capacity for that ion. However, as selective resins are based on relative affinities, the actual selectivity is also relative and not absolute.

Ion exchange resins can be regenerated once their capacity to exchange ions has been exhausted; that is, all of the functional groups have already exchanged their original ion for one which was in the solution. This is also known as a resin which has been "saturated" in that it cannot adsorb any additional ions. The process of regeneration is simply the reverse reaction of the original ion exchange. Clean water is first flushed through the saturated resin to remove any particles, solids, or other contaminations. A solution containing a high concentration of the original ion (e.g., the H+ ions contained in an acid) is then passed through the resin, causing the ion captured on the functional group (e.g., Cu2+) to forcibly detach from the functional group and solubilize into the solution and be replaced by the H+ ions from the acid. Depending on the type of resin (cation or anion, weak or strong) different chemicals are used to regenerate resins. In the case of selective or chelating resins, the strong affinities exhibited by these resins require greatly increased chemical consumption for the regeneration process. Regeneration results in a return of the resin to its original form (suitable for reuse) and a solution, also known as the regenerant, containing all of the metals or other ions stripped from the resin. Depending on its composition and complexity, some regenerants can be further processed by methods such as electrowinning to recover metals. The chemical consumption for regeneration as well as the difficulty and costs of treating or disposing of regenerants containing metals is the principal reason why ion exchange is often not a cost effective wastewater treatment option for metal bearing wastes.

SUMMARY OF DISCLOSURE

In a first implementation of this disclosure, a system in accordance with one particular embodiment may include a vacuum filter band system configured to receive a saturated resin tank from a front end system, the vacuum filter band system configured to generate a slurry from the saturated resin tank and to provide a cascading resin rinse to the slurry. The system may further include a repetitive stripping system configured to receive a metal-filled purification unit from a metal specific purification system. The repetitive stripping system may be further configured to sequentially apply the contents of a plurality of acid tanks to the metal-filled purification unit to generate a metal salt.

One or more of the following features may be included. The plurality of acid tanks may include three acid tanks. At least one of an acid, an oxidant agent, and a reductive agent from each of the plurality of acid tanks may be pumped through the metal-filled purification unit in a pre-selected order. Each of the plurality of acid tanks may include a different concentration of acid with varying, accumulated target metal salt levels. The metal-filled purification unit may include at least one of copper, nickel, zinc, and an ion exchange resin. The ion exchange resin may be at least one of an iminodiacetic ion exchange resin, silica gel, chemically modified silica gels, and other inorganic supports.

In some embodiments, the repetitive stripping system may be configured to provide an output to a product surge tank. A most frequently used acid may be included within at least one of the plurality of acid tanks, the most frequently used acid being applied to the metal-filled purification unit first. A first acid tank may be configured to dispense acid to the metal-filled purification unit, a second acid tank may be configured to dispense into the first acid tank, and a third acid tank may be configured to dispense into the second acid tank. A product surge tank may be configured to receive an effluent resulting from the first acid tank emptying into the metal-filled purification unit.

In another implementation of this disclosure, a method in accordance with one particular embodiment may include receiving a saturated resin tank from a front end system at a vacuum filter band system and generating a slurry from the saturated resin tank. The method may further include providing a cascading resin rinse to the slurry and receiving a metal-filled purification unit from a metal specific purification system at a repetitive stripping system. The method may also include sequentially applying, at the repetitive stripping system, the contents of a plurality of acid tanks to the metal-filled purification unit to generate a metal salt.

One or more of the following features may be included. The plurality of acid tanks may include three acid tanks. The method may also include pumping acid from each of the plurality of acid tanks through the metal-filled purification unit in a pre-selected order. Each of the plurality of acid tanks may include a different concentration of acid. The metal-filled purification unit may include at least one of copper, nickel, zinc, and an ion exchange resin. The ion exchange resin may be an iminodiacetic ion exchange resin.

In some embodiments, the method may further include providing an output to a product surge tank via the repetitive stripping system. The method may also include including a most frequently used acid within at least one of the plurality of acid tanks and applying the most frequently used acid to the metal-filled purification unit first. The method may additionally include dispensing acid from a first acid tank to the metal-filled purification unit, dispensing acid from a second acid tank into the first acid tank, and dispensing acid from a third acid tank into the second acid tank. The method may also include receiving an effluent resulting from the first acid tank emptying into the metal-filled purification unit at a product surge tank.

The details of one or more embodiments are set forth in the accompanying drawings and the description below. Features and advantages will become apparent from the description, the drawings, and the claims.

DETAILED DESCRIPTION

Figure 1:
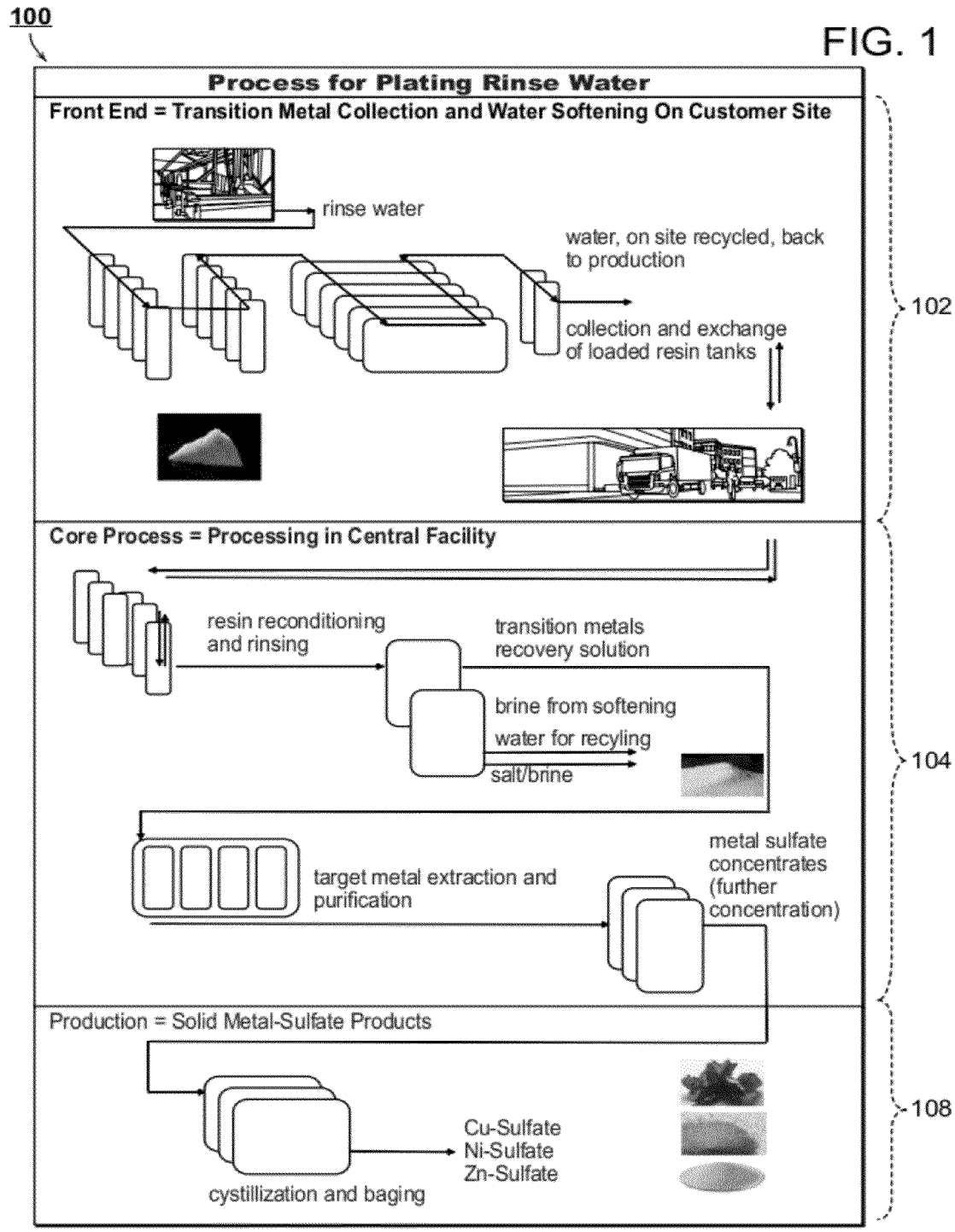
FIG. 1 is an exemplary embodiment of a wastewater system in accordance with the present disclosure.

The present disclosure is directed towards an automated, modular, ion exchange resin based system that may process metal bearing wastewaters such that the treated water can be recycled, or discharged in compliance with regulatory standards. Embodiments of the present disclosure may capture the metals within the wastewater and then separate, purify and concentrate each individual metal into commercially salable end products such as metal sulfates.

The system may be comprised of a front end unit situated at the site of wastewater generation, and a central processing facility where the metal bearing ion exchange columns from numerous front end units are collected and processed. Alternatively, where treatment volumes, economic, and/or regulatory considerations so merit, the central processing facility can be located together with the front end system.

Embodiments of the present disclosure may be used to collect environmentally regulated metals from the rinse water streams of plating baths and similar operations. Rinse water may be generated when various work pieces are cleaned to receive the final, surface washed, product. Excess plating fluid may need to be removed prior to drying, packing and shipping of the work pieces. The rinse water quality or the abundance of metals which are carried into the rinse water may be dependent upon the rinse process itself (e.g., spraying, dipping, stifling, etc.) and also the overall surface properties and nature of the plated work piece. Thus, the concentration of toxic metals such as copper, nickel, zinc and chrome may vary at a particular shop.

Generally, the present disclosure may be used to provide safe and efficient removal of environmentally regulated metal contaminations on-site at various plating facilities. Embodiments of the present disclosure may include replacement of exhausted resin tanks with re-conditioned, full capacity tanks and transport between the plating facility and an off-site central processing facility. Embodiments of the present disclosure may be used to recover industrially valuable metals including, but not limited to, Cu, Zn, Ni and Cr as metal salt products in liquid or solid form. Once these metals have been successfully recovered, they may be re-distributed as high quality, recycled metal salts back to the plating industry or other consumers. The systems and methods described herein may be used to provide safe and efficient treatment of residual toxic metals and reduction of the overall waste volume by more than 80%.

In some embodiments, the present disclosure may apply to a wide variety of processes where metals from a surface treatment are carried into rinsing waters and waste streams. The teachings of the present disclosure may be used to replace, in whole or in part, conventional sludging and landfill technology, which has been employed since the early days of wastewater treatment. While the present disclosure may discuss industrial metals such as copper, nickel, zinc and chromium, it is by no means intended to be limited to these metals, as the teachings of the present disclosure may be used to treat any numerous types of metals.

Ion exchange technology is based upon the electro static interaction of ions dissolved in water with certain organic functional groups. These groups may attract the positively or negatively charged ions and exchange their proton or hydroxide ion used to pre-condition the functional groups. Positively charged ions are referred to as cations while the negatively charged ions are referred to as anions. The organic functional groups may include, but are not limited to, sulfonic acid, carboxylic acids, tertiary amines, and quaternary amines. The organic groups are typically bound chemically to styrene or acrylic copolymers. The polymers may provide a water insoluble backbone with a high surface area to filter the ions form a water stream pumped in an efficient and controlled manner.

In some embodiments of the present disclosure, the ion exchange polymers or resins may be filled, for example, into tanks or columns (e.g., 80-100 L). This may allow for the easy replacement of a saturated ion exchange resin. A saturated ion exchange resin is a polymer where all, or the vast majority of, available functional groups have been replaced with the target ions. The resin at this point may require reconditioning which may allow for the harvesting of the "loaded" ions.

In some embodiments, ion exchangers or resin tanks may be immobilized and may act like an ion selective filter. This means that much diluted metal ions in water streams are adsorbed and concentrated on the ion exchange resin. Very large volumes of water can be treated with relative small ion exchange tanks or cartridges. The other contaminants in the water stream are not attracted to the ion exchange resins. Wastewater treatment is therefore very effective and feasible when employing ion exchange technology. Also, there are ion exchange resins which support an even more selective organic functional group. These ion exchange resins may allow for an additional level of selectivity and adsorption capabilities.

Embodiments of the present disclosure may utilize both non-selective and metal selective ion exchange resins. One of the strengths in employing the selective ion exchange resins is the capability to attract specific metal ions stronger than other metals. For example, copper is attracted almost selectively to ion exchange resins of the imminodiacetic acid type. The transition metals (i.e. Cu, Zn, Ni) form a well-defined hierarchy of attraction to this organic functional group.

In contrast, a non-selective exchange resin may be able to adsorb a wide range of ions and therefore remove potential contaminations completely. In some embodiments of the present disclosure these resins may be used for water demineralization prior to recycle or as polishers.

Referring now to FIG. 1, a schematic 100 depicting an embodiment of a wastewater process in accordance with the present disclosure is provided. In some embodiments, the wastewater process may include both a front end system 102, which may take place at a customer site such as a plating facility, and a core process 104, which may occur at a central facility.

In some embodiments, front end system 102 may consist of several individual processes assembled linearly into a seamless treatment system, which may be controlled by a programmable logic controller linked to sensors, pumps, valves, and other hardware associated with system 102. Each process may remove or treat a particular contaminant in the wastewater either to meet, or exceed, regulatory discharge criteria and/or to ensure proper operation of the ion exchange tanks for metal removal. Non-regulated substances may be disposed of on site, while regulated materials (primarily transition metals) may be collected in columns and cartridges for transport to a central processing facility.

In some embodiments, front end system 102 may be configured to perform a passive removal of the metal contamination in the rinse waters generated at the plating facility. The effluent out of front end system 102 may be filtered to contain little or no regulated or toxic metals and may either be discharged and/or treated for its organic contamination (e.g., chemical oxygen demand (COD) or total organic carbon (TOC) removal).

Once the loading capacity of the ion exchange resins in front end system 102 is reached, the ion exchange resin tanks may be exchanged with freshly reconditioned resin tanks. The exhausted and metal loaded tanks may be transported back to core process 104 at the central processing facility. The central facility may harvest the target metals from the loaded resins and re-conditions the material for re-use at the plating sites.

In some embodiments, the harvested metals may be collected as a liquid having a mixed metals concentrate. This solution may then be used to isolate and purify the individual target metals, copper, nickel and zinc. The metals may be collected as a very highly concentrated metal sulfate solution.

In some embodiments, the product of core process 104 may be provided to production phase 106, which may be configured to create a crystallization of the metal liquors to generate metal sulfate salts. The sulfates may be fed back into the market as resource for plating facilities 102 or to related industries.

In some embodiments, some or all of the metals that are not economically viable or are too toxic to be discharged untreated, may undergo a conventional hydroxide precipitation. The sludges received may be treated and disposed of via the existing waste management facilities and companies. The sludge volume produced by core process 104 at the central facility may be a tiny fraction of the originally produced amount generated using existing technologies. Core process 104 and production phase 106 may also allow for improved detoxification to provide a safe and reliable service to the public and environment.

Front End System

Figure 2:
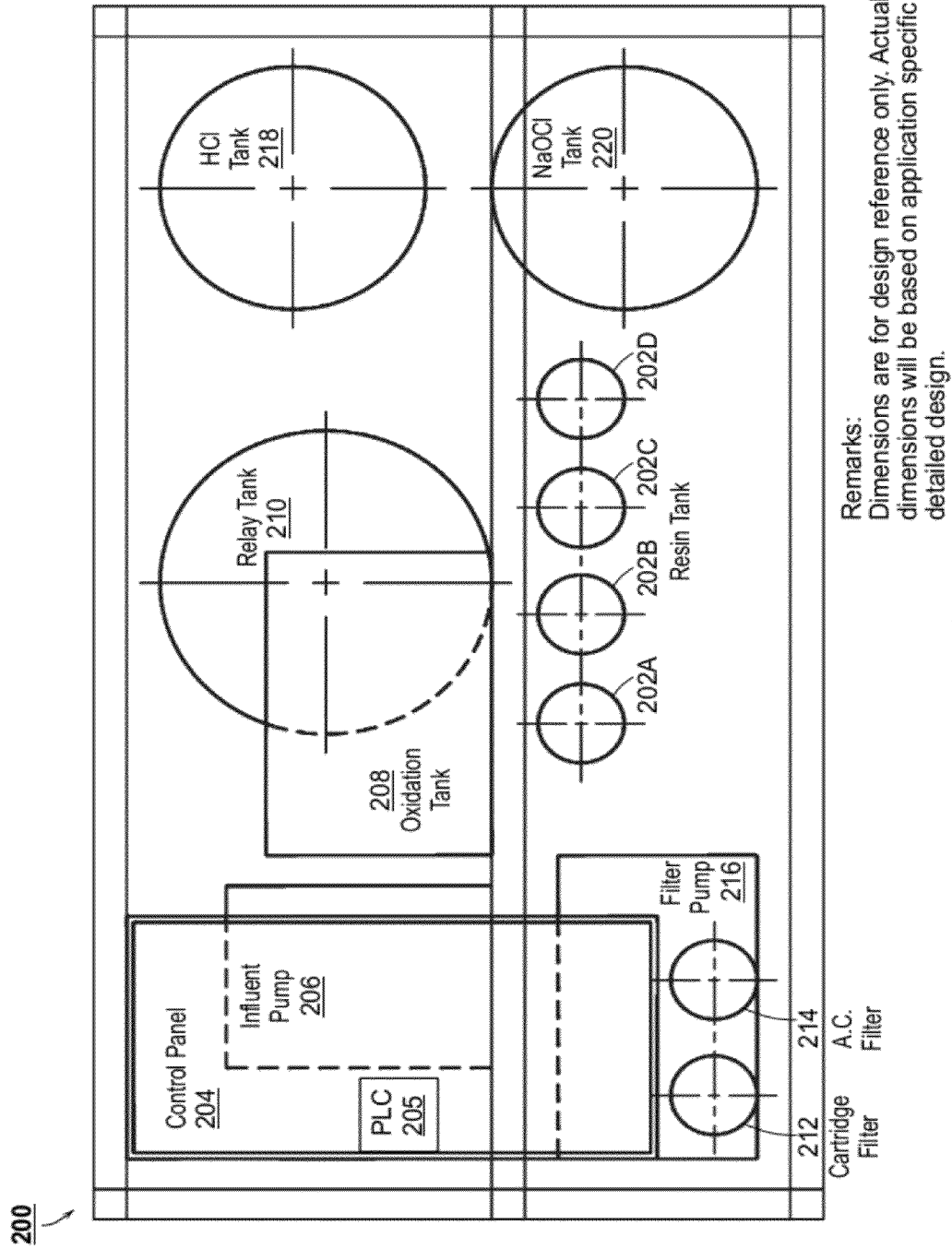
FIG. 2 is an exemplary embodiment of a wastewater system in accordance with the present disclosure.

Referring now to FIG. 2, one exemplary embodiment of front end system 200 is provided. System 200 may include one or more resin tanks 202A-D, which may be configured to contain an ion exchange resin. Numerous ion exchange resins may be used in accordance with the present disclosure. For example, some ion exchange resins may be strongly acidic, strongly basic, weakly acidic, or weakly basic. The ion exchange resin may also be a chelating resin, such as chelex 100, or any other suitable ion exchange resin. The adsorption of ions or metal complexes is however also possible with inorganic support materials like silica gels or chemically modified silica gels. The adsorption mechanism can be of hydrophobic interaction or hydrophilic interaction mechanism or other nature.

Figure 9:
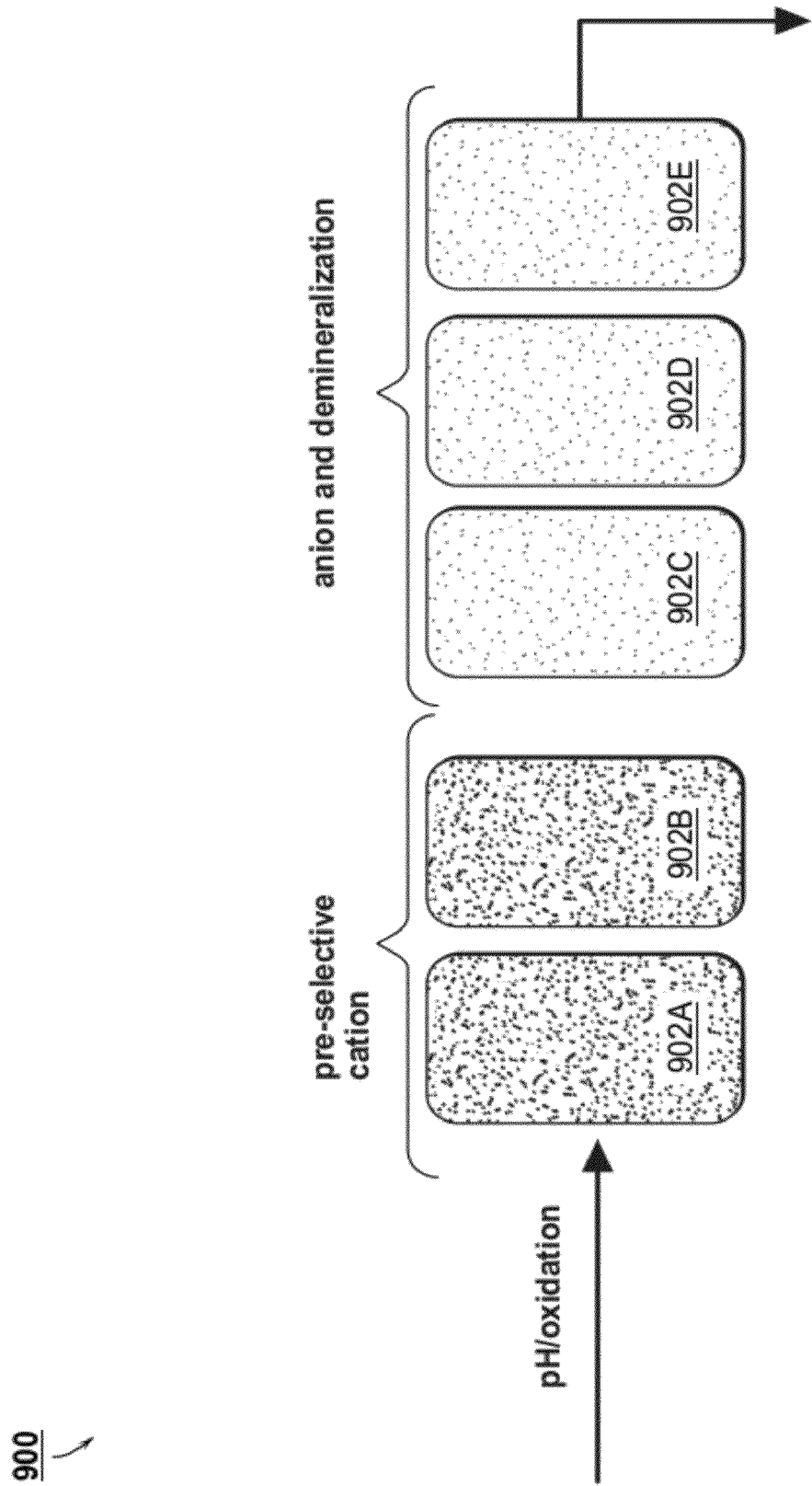
FIG. 9 is an exemplary embodiment of a wastewater system in accordance with the present disclosure.

In some embodiments, the efficiency of the filtering and metal removal may be significantly improved by employing a pre-selective ion exchange resin of the iminodiacetic acid type as shown in further detail in FIG. 9. In this way, precious ion exchange capacity may not be used up by the metal ions which are in high natural abundance but are not regulated by the authorities because of their non-toxic character (e.g., sodium, calcium, magnesium, potassium, etc.). This way the first economic pre-selective mechanism may be applied to preserve resources and ion exchange capacity. Thus, embodiments of the present disclosure may be used to remove transition metals such as copper, nickel, and zinc with a preference over the monovalent base metals (Na, K, etc.) or the divalent base metals (e.g., Ca and Mg). This pre-selection may allow for enriching only the metals which are valuable target metals and/or those that are regulated by the environmental authorities.

In some embodiments, system 200 may further include a control panel 204, which may be configured to control one or more operations of system 200. Control panel 204 may include a programmable logic controller (PLC) 205, or similar device, which may be configured to monitor and/or govern the operating parameters of front end system 200. Sensors may be placed throughout system 200 to provide operational system data including, but not limited to, the volume in various tanks, system throughput, flow rates, pH of the wastewater in each process step, volume of available chemical reagents, oxidation/reduction potential, pressure, etc. PLC 205 may be configured to process this incoming data on a real time basis and then issue commands to pumps, valves, and other system hardware according to the algorithms of its proprietary software. A flowmeter, or similar device, may measure the total throughput volume of the system, while several smaller flowmeters may monitor the flow rate through individual components of system 200. In some embodiments, PLC 205 may be operatively connected to a communications system whereby data may be transmitted wirelessly or via the internet to a centralized control center. This may allow for remote monitoring of the operations of system 200. This may also provide for decreased personnel costs as well as for optimizing the scheduling of resin tank changes and/or replacement.

In some embodiments, control panel 204 and/or PLC 205 may allow an operator to control the flow of influent wastewater using influent pump 206. Influent pump 206 may be configured to provide influent wastewater to one or more storage tanks within system 200, e.g., oxidation tank 208. Oxidation tank 208, which will be described in further detail hereinbelow, may provide an output to relay tank 210. Relay tank 210 may be operatively connected to cartridge filter 212 and activated carbon (AC) filter 214. One or more filter pumps 216 may also be used to pump the wastewater through various portions of system 200. System 200 may also include acid tanks such as hydrochloric acid (HCL) tank 218 and sodium hypochlorite (NaOCL) tank 220, which may be operatively connected via pumps, valves, etc to portions of system 200. Additional details of system 200 are described below with reference to FIG. 3. Depending on the components recovered and the adsorption mechanism used, other chemicals might be used.

Figure 3:
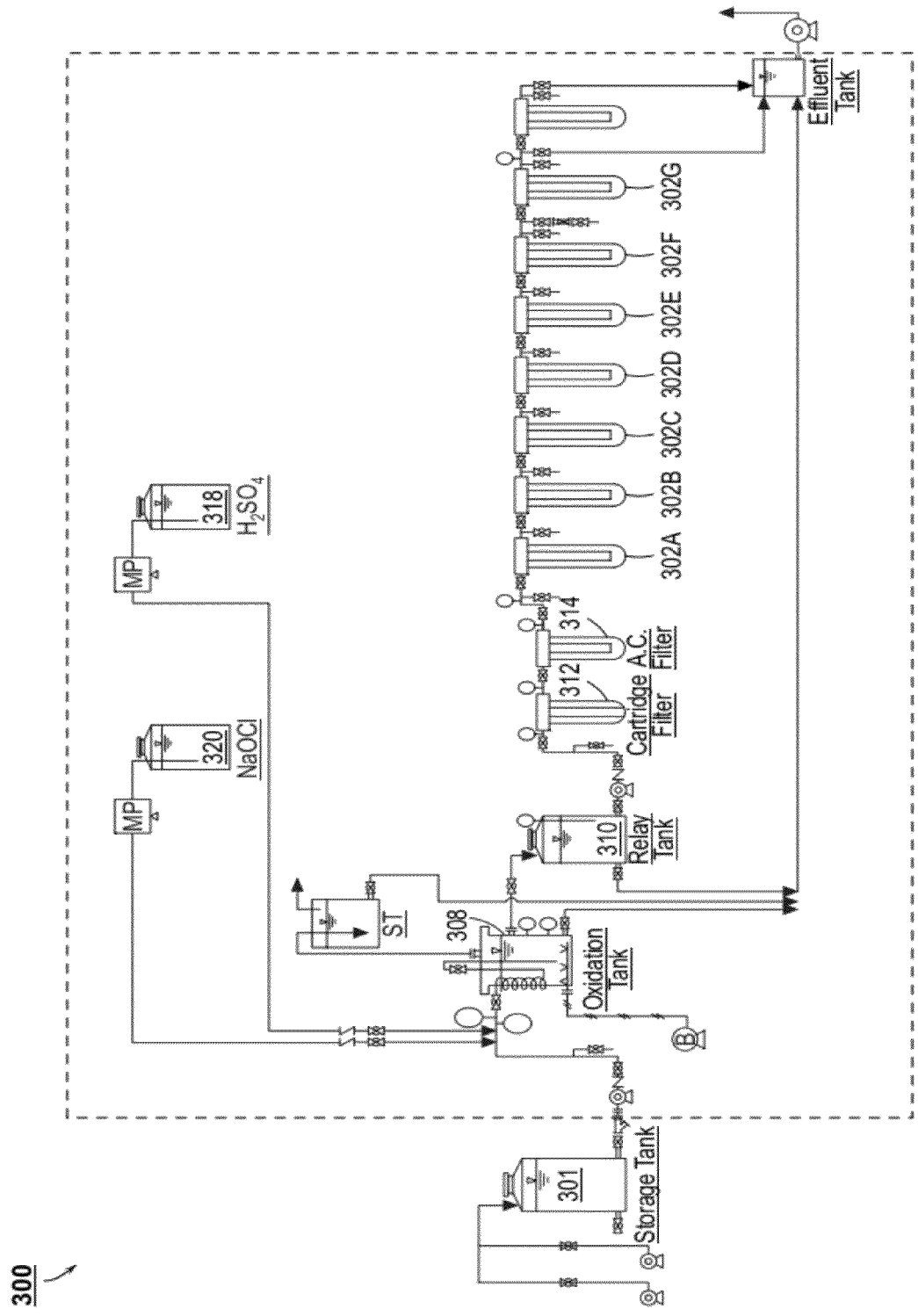
FIG. 3 is an exemplary embodiment of a wastewater system in accordance with the present disclosure.

Referring now to FIG. 3, an exemplary embodiment of system 300 showing resin tanks 302A-G arranged in a series arrangement is provided. Initially, wastewater from the customer may be stored in buffer tank 301, which may be configured to regulate the flow of wastewater into system 300. In addition, the concentrations of the varying contaminants may be modulated and normalized (if required). Buffer tank 301 may also allow for the assaying of wastewater characteristics including, but not limited to, metals present and their respective concentrations, pH, suspended solids, chemical oxygen demand, and oxidation/reduction potential.

In some embodiments, the initial resin columns (e.g., 302A and 302B) may become saturated first. This design may allow for a partially or entirely mobile system, which may provide for easy transfer of the resin tanks to and from the central facility. Resin tanks 302A-G may be of any suitable size, for example, in one particular embodiment each of tanks 302A-G may be configured to contain approximately 80-100 liters of ion exchange resin. Each resin tank associated with tanks 302A-G may further include one or more RFID tracking tags or similar devices, which may be configured to provide monitoring capabilities, which are discussed in further detail below.

In some embodiments, each resin tank may be configured to continuously extract copper (Cu), zinc (Zn), and Nickel (Ni) from the rinse water generated by the plating process. This may be achieved by pumping the rinse water over the ion exchange resin tanks 302A-G after intermediate storage in relay tank 310. The actual trapping of the transition metals Cu, Ni, and Zn may occur in a passive way. One or more pumps may supply the energy required for the loading or filtering process. After the rinse water has passed through resin tanks 302A-G, metals such as copper, nickel, and zinc, for example, may be removed to a level below the local discharge limits (e.g., 1-3 mg/L, depending on the metal). The water may then either be treated further for its organic contamination or, if complying already with the local regulation, may be discharged into the municipal drains. As the loading capacity of the ion exchange resin is known (i.e., volume of resin), the filter capacity may be easily adjusted to the observed levels of metal contamination (e.g., individually for each workshop). For example, a standard usage time until replacement with a fresh set of resin tanks may occur after approximately ten working days (e.g., 2 operational weeks utilizing 40 $m^3$ of rinse water daily).

In some embodiments, each of resin tanks 302A-G may be wholly or partially enclosed and may be fitted with appropriate inlet and outlet openings for the flow of the water to be treated. Resin tanks 302A-G may be configured to contain and support the resin, thus creating a resin bed of defined height and depth. This configuration may also provide the environment for the ion exchange reaction to occur as the wastewater may be passed through each of resin tanks 302A-G and evenly distributed throughout the resin bed. There are several possible flow designs that may be used in order to pass solutions through each of resin tanks 302A-G, including, but not limited to, top in/bottom out, bottom in/top out, and top in/top out. Resin tanks 302A-G may be connected to additional equipment, such as pumps, valves, piping, etc., which may regulate the inflow/outflow of wastewater, reagents for regeneration, and backwash solutions. As ion exchange resins may undergo fouling and congestion from organics and solids, only certain types of wastewaters may be suitable for ion exchange treatment. In other cases where the levels of inappropriate contaminants are within a manageable range, pretreatment steps such as filtering and oxidation may be taken prior to the wastewater entering resin tanks 302A-G in order to ensure proper operation.

In operation, during the loading phase, one or more of resin tanks 302A-G may contain fresh resin and wastewater may be pumped through the resin tanks at a rate designed to provide an adequate amount of contact time between the wastewater and the resin for the ion exchange reaction to occur. As wastewater flows through the resin bed, the ion exchange reaction may occur and metals and other ionic contaminants may be removed from the wastewater and trapped on the resin. As the exchange capacity of the resin becomes progressively exhausted, some metals may not be captured by the resin and may begin to leak out of, or "breakthrough", one or more of resin tanks 302A-G. Consequently, resin tanks 302A-G may be configured in series, as shown in FIG. 3, so that each resin tank may be able to capture any metals or ions which escape the tank preceding it; thus ensuring a successful treatment of the wastewater. Once a resin tank becomes saturated, it may be taken offline (e.g., using control panel 204), or out of the series of tanks 302A-G in service operation, and regenerated. The physical handling and exposure to chemicals may cause degradation of the resin's structure and exchange capacity over time. Therefore, this loading/regeneration cycle may be performed repeatedly until the operational life of the resin is reached, and it is no longer economical or possible to continue use of the resin. At that point, the exhausted resin may be discarded, and resin tanks 302A-G may be filled with new resin.

System 300 may further include a control panel such as control panel 204 shown in FIG. 2, which may be configured to control the operation of various components throughout the system. Control panel 204 may include a programmable logic controller or similar device, which may be operatively connected to the valves, pumps, sensors and control lines of system 300. Control panel 204 may include numerous types of circuitry, which may be in communication with the components of system 300.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

As discussed above, front end system 300 may use a pre-selective ion exchange mechanism to pre-separate many regulated metals from the non-toxic base metals. Sensors may be placed throughout system 300 to monitor operational parameters and feed data to programmable logic controller 205 associated with control panel 204. Each process within system 300 may remove or treat a particular wastewater contaminant to particular concentrations, which at a minimum, satisfy recycling or regulatory discharge standards.

In some embodiments, relay tanks, such as relay tank 310, may regulate input flow rate and allow for the assaying of the wastewater as well as pH adjustment (as required). Relay tank 310 may be configured to receive an output from numerous sources, such as oxidation tank 308. Oxidation tank 308 may be configured to destroy and/or reduce organic agents that could potentially negatively impact the efficiency of the ion exchange resin tanks 302A-G that follow. The output from relay tank 310 may be sent to one or more filters, including, but not limited to cartridge filter 312 and activated carbon filter 314.

In some embodiments, cartridge filter 312 or other mechanical filters such as a mesh bag or sand filter, may remove suspended solids and other particles. Cartridge filter 312 may provide an output to activated carbon filter for additional filtering operations. For example, activated carbon filter 314 may polish the wastewater to remove any potentially remaining interfering organics and/or suspended solids.

Once the filtering is complete, the wastewater may be sent to resin tanks 302A-G, which may contain various types of ion exchange resins. Resin tanks 302A-G may be housed in mobile tanks, which may be taken off or put on line as necessary. Resin tanks 302A-G may be configured to capture target metals as well as other cationic or anionic species. Individual resin tanks 302A-G may be radio frequency identification (RFID) tagged and linked with a central database mining and logistical software system.

In some embodiments, system 300 may further include one or more acid tanks, which may be configured to provide an acid solution to portions of system 300. For example, $H_2SO4$ acid tank 318 and NaOCL acid tank 320 may be connected to one or more lines or tanks of system 300. These particular acids are merely provided for exemplary purposes as various other types of acids and solutions may be used as well.

Figure 4:
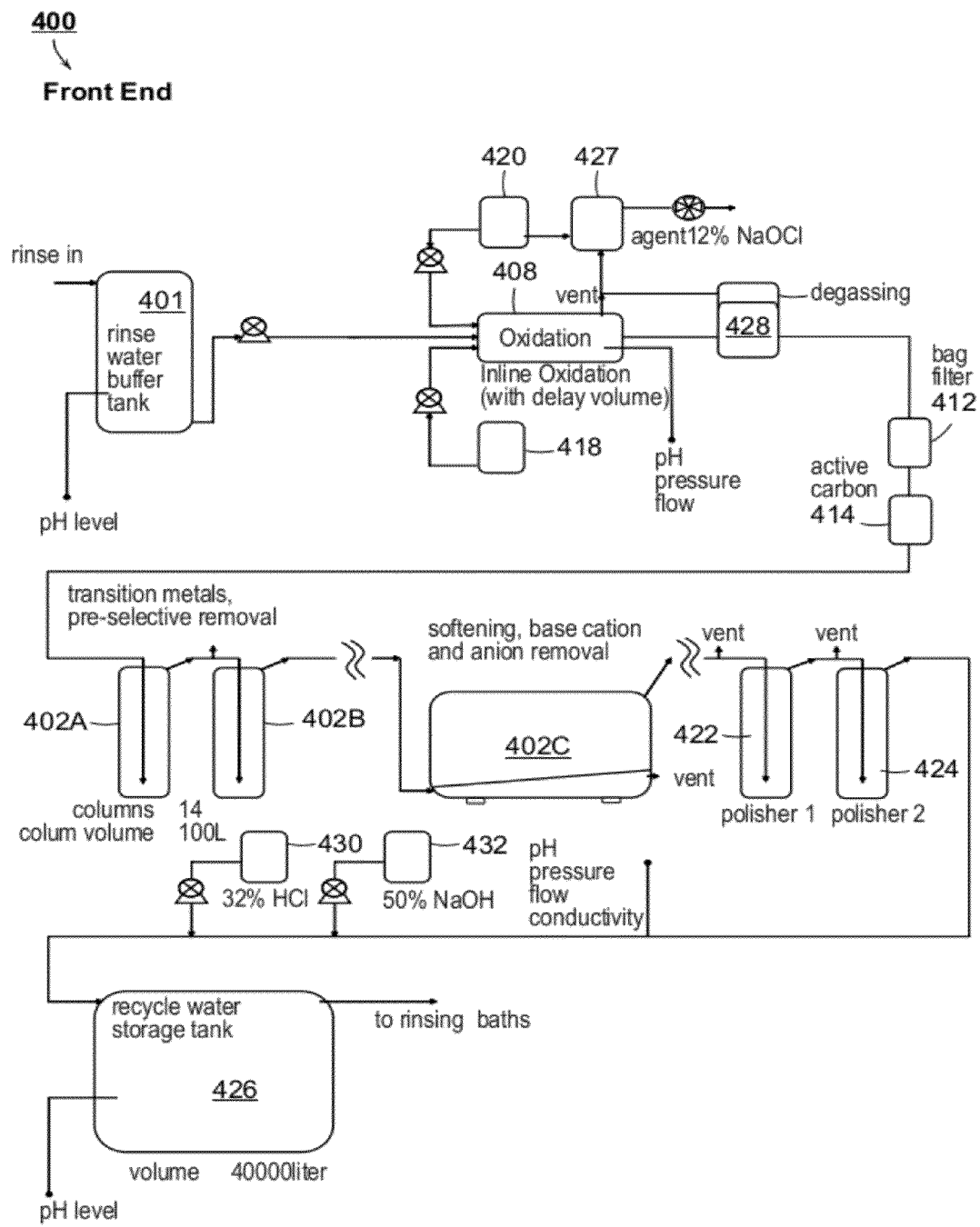
FIG. 4 is an exemplary embodiment of a wastewater system in accordance with the present disclosure.

Referring now to FIG. 4, an additional embodiment of front end system 400 is depicted. System 400 may include buffer tank 401, which may be configured to store wastewater in order to regulate the flow rate into system 400. In addition, the concentrations of the varying contaminants may be modulated and normalized (if required). Buffer tank 401 may also allow for the assaying of wastewater characteristics including, but not limited to, metals present and their respective concentrations, pH, suspended solids, chemical oxygen demand, and oxidation/reduction potential.

In some embodiments, wastewater may be pumped at a designated flow rate from buffer tank 401 to inline oxidation reactor 408. Oxidation reactor 408 may be configured to destroy interfering organic agents such as cyanide and surfactants and is discussed in further detail with reference to FIGS. 5-6. Oxidation reactor 408 may receive NaOCL from acid tank 420 and HCL from acid tank 418. Using oxidation chemicals such as sodium hypochlorite, hydrogen peroxide, sodium hydroxide, or electrochemical techniques, wastewater may be oxidized at low (e.g., 4-6) pH to prevent and/or reduce precipitation of target metals, and under positive pressure to keep the active oxidation agent in solution. The dual chamber design of oxidation reactor 408 may create a two step oxidation of organic, as well as inorganic interfering contaminants. Oxidation reactor may include one or more outlet ports, which may be configured to allow various gases to travel to scrubber 427 and/or degassing chamber 428.

In some embodiments, the wastewater may be pumped from oxidation reactor 408 to mechanical filter 412. Mechanical filter 412 may be any suitable filter including, but not limited to, sand filters, bag filters, etc. Mechanical filter 412 may be configured to remove suspended solids and other particles to prevent clogging or fouling of ion exchange (i.e., resin) tanks 402 downstream in system 400.

In some embodiments, the wastewater may exit mechanical filter 412 and be pumped through activated carbon filter 414. Activated carbon filter 414 may be configured to adsorb any interfering organics that may still remain dissolved, as well as any residual suspended solids. At this point, the wastewater may be substantially free of any solids, particles, interfering organics, chelating agents, or other contaminants that could adversely impact the efficiency of the ion exchange process to follow.

In some embodiments, upon leaving activated carbon filter 414, the pH of the wastewater may now be adjusted and controlled (if necessary, depending upon the metals present) in a relay tank such as relay tank 310 depicted in FIG. 3. The wastewater may then be pumped at a designated flow rate into ion exchange tanks 402A-B, which may be placed in series and may contain selective ion exchange resins. While only two pre-selective ion exchange tanks are depicted in FIG. 4, it is envisioned that any number of ion exchange tanks may be used without departing from the scope of the present disclosure. Softening, base cation and anion demineralization may occur in tank 402C.

In some embodiments, ion exchange tanks 402A-B may be constructed out of an extreme pH (e.g., acid and alkaline) resistant, pressure bearing and unreactive material such as fiberglass reinforced plastic (FRP). Ion exchange tanks 402A-B may be of a suitable height and diameter to create the proper resin bed depth for the flow rate of system 400. The tanks may also need to be sized to allow for sufficient room for fluidization and expansion of the resin bed. The number of ion exchange tanks used may be dependent on the desired daily volume capacity and time involved between exchanging of tanks. Each ion exchange tank may be fitted with a bypass valve, allowing for on-the-fly servicing of an individual tank, or tanks, without the need for a shut down of the entire front end system 400.

In some embodiments, each individual ion exchange tank may be mobile and set in a frame or housing, which may provide additional protection as well as simplified handling and transportation. Each ion exchange tank may also be fitted with a unique radio frequency identification (RFID) tag linked into a logistical management system. Handheld, truck mounted, and central processing facility mounted sensors may allow for the real time tracking and management of all of the ion exchange tanks (e.g., 402A-B), as well as for the creation of an operational history, which may be managed by database software. In this manner, the history of each ion exchange tank, including parameters such as, but not limited to, service location, service time, metals captured, exchange efficiency/capacity, regeneration results, and operational life can be accumulated in the database. System 400 may further include database mining software, which may be used to analyze the data to identify operational trends and efficiencies; which may then be used to optimize operating procedures and lower costs.

In some embodiments, for example where large volumes of wastewater must be treated, several sets or strings of ion exchange tanks may be placed in parallel. Each individual set or string may include an independent bypass valve. In this layout, an individual set of ion exchange tanks may be taken offline for servicing while the other set(s) of tanks may continue in operation. This may allow for continuous operation of front end system 400 with minimal downtime. Alternatively, larger ion exchange tanks may be mounted directly on a mobile platform such as a flatbed trailers to process high volume applications.

In some embodiments, each set of ion exchange tanks (e.g., 402A-B) may include a sensor positioned between two ion exchange tanks near the end of the series, which may be designed to detect the presence of metals in the wastewater. A positive signal from this sensor may indicate a malfunction or breakthrough from the ion exchange tank preceding the sensor. This sensor may trigger an alarm that signals the operator that an exchange of ion exchange tanks may be necessary. Further, a visual indicator consisting of a clear segment of piping containing ion exchange resin may be located next to the sensor and also between the two ion exchange tanks. Typically, the ion exchange resin may change color as they adsorb metals. Consequently, a change in the color of the indicator resin may allow for a visual backup alarm to the operator that breakthrough has occurred and that an exchange of ion exchange tanks is required. This change in color may be determined using additional sensing equipment or via visual inspection by the operator. This design may insure that metal bearing wastewater does not escape system 400 as a whole, and that treated wastewater leaving system 400 is in compliance with regulatory discharge limits and/or recycling water quality standards. Additional sensors and indicators may be placed throughout the series of ion exchange tanks in order to monitor operational parameters.

In some embodiments, once the metals and other ionic species have been captured by ion exchange tanks 402A-B, the effluent from these tanks may be stored in a tank 402C prior to being sent to polishers 422 and 424. Polishers 422 and 424 may be used to remove any remaining suspended particles that were not removed previously. Upon leaving polishers 422 and 424, the wastewater may be sent to recycled water storage tank 426 for subsequent storage. The resulting water in water storage tank 426, may be suitable for discharge from the facility, or alternatively, for recycling and reuse onsite. Additional acid tanks 430 and 432 may be operatively connected to recycled water storage tank 426 and configured to provide various acids and/or solutions to tank 426 through one or more transmission lines. In cases where recycling may require higher purity water, the treated water may be pumped through a reverse osmosis system or treated with a traditional demineralization system prior to reuse.

In some embodiments, once ion exchange tanks 402A-B have captured the necessary metals and other contaminants ion exchange tanks 402A-B may then be transported to the central processing facility for regeneration and recycling. A positive air pressure device may be used to purge each tank of excess water in order to minimize weight and facilitate handling and transportation. Some wastes that are free of regulated materials (i.e. metals), such as backwash from a sand filter, may be disposed of onsite and may not require transportation. Alternatively, in applications where economic, regulatory or other considerations merit, (such as large daily wastewater volumes or restrictions on the transport of regulated materials), the central processing facility may be located on the same site as front end system 400. This layout may eliminate handling and transportation costs with no detrimental effect on capabilities or effectiveness of the system.

Figure 5:
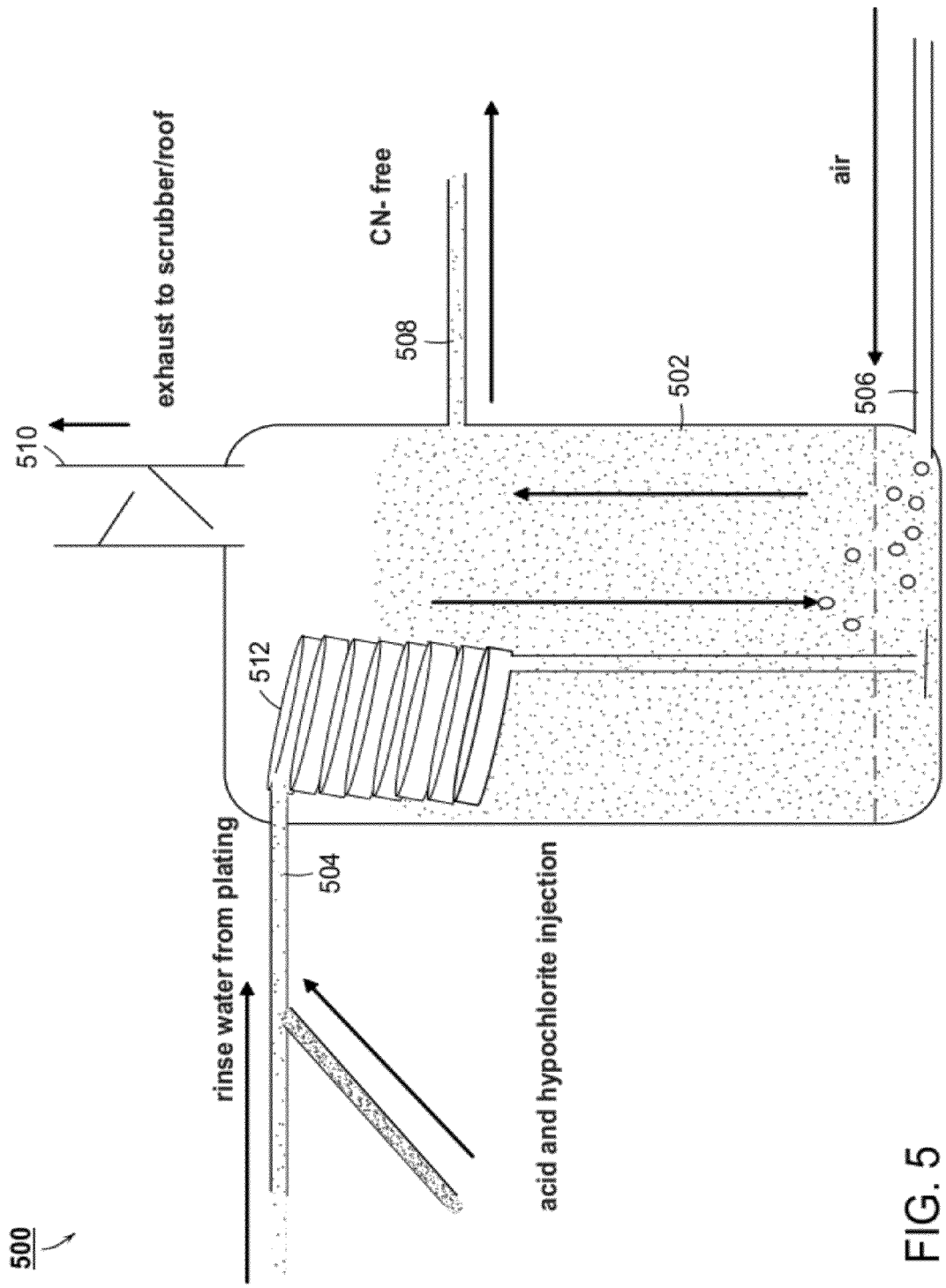
FIG. 5 is an exemplary embodiment of a wastewater system in accordance with the present disclosure.
Figure 6:
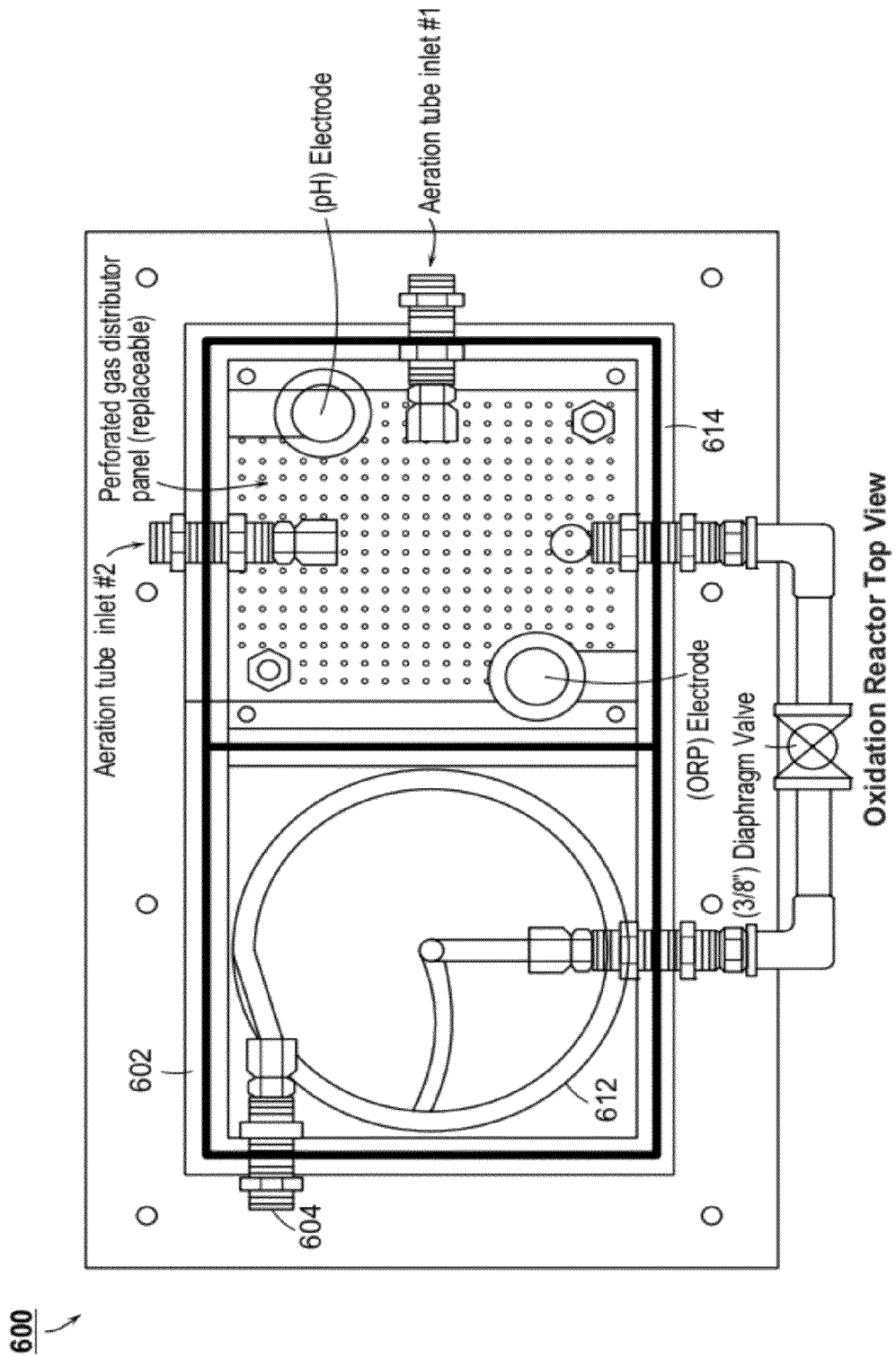
FIG. 6 is an exemplary embodiment of a wastewater system in accordance with the present disclosure.

Referring now to FIGS. 5-6, as discussed above, systems 300 and 400 may include oxidation tank 308, 408, 500, which may be placed between the influent wastewater stream and resin tanks 302A-G. Occasionally, during the plating process, some metals may be plated while they are stabilized with a chemical agent, typically cyanide. However, cyanide is a strong chelating agent and may interfere with the ion exchange chemistry. In this way, cyanide may prevent the metal ion from being trapped or adsorbed by the functional groups within resin tanks 302A-G. Thus, the process could lose efficiency and toxic metals and cyanides could escape the proper treatment. Cyanide may be destroyed with a strong oxidation agent such as sodium hypochlorite or bleach (NaOCl in NaOH solution, pH ca. 12). The reaction may occur in a stirred reactor prior or parallel to the hydroxide precipitation.

In order to address this issue, in some embodiments, system 300 may include oxidation reactor 500, which may be configured as a flow through reactor to allow for the destruction of cyanide and other organic contamination in the rinse water. Oxidation reactor 500 may include oxidation vessel 502 having inlet port 504, air inlet port 506, outlet port 508, exhaust port 510, and reaction member 512. Oxidation reactor 500 may be used to oxidize cyanide at a low pH (e.g., 4-6) while the reaction solution may be pressurized in reaction member 512, which may take on the coiled configuration depicted in FIG. 5. The low pH may prevent hydroxide precipitation of the valuable target metals while the pressure maintains the active chlorine in physical solution. In this way, the reduced oxidation potential of the sodium hypochloride or other strong oxidation agents may be compensated and even improved.

In some embodiments, inlet port 504 may be configured to allow numerous liquids to enter oxidation vessel 502. For example, rinse water from various plating operations may enter oxidation vessel 502 through inlet port 504. Inlet port 504 may also allow for the addition of water peroxide and various other agents such as bleach. Air inlet port 506 may be configured to allow for the addition of air or other gases to oxidation vessel 502, which may result in the removal of chlorine gas through exhaust port 510. Outlet port 508 may be associated with a carbon filter or similar device, which may be configured to remove chlorine and/or decomposed organics. Exhaust port 510 may act as a conduit to receive cyanide and chlorine gas for removal. A low pH may result in outgassing within oxidation vessel 502, however, a high pH may result in the formation of metal hydroxides, as such pressurized reaction coil 512 may be used to counteract a high pH.

In some embodiments, reaction coil 512 may be arranged using piping in a stacked coil in order to create an enclosed and elevated pressure environment while increasing the time the wastewater remains in oxidation vessel 502. Reaction coil 512 may be of any suitable length, in one embodiment, reaction coil 512 may be a couple of meters in length. Dosing pumps may be operatively connected to oxidation vessel 502 via piping in order to adjust pH and for the introduction of the oxidizing agent to the wastewater. Oxidation vessel 502 may further include at least one monitor configured to measure the pH of the wastewater. The monitor may be operatively connected to a control system, which may dynamically alter the pH of the wastewater in the vessel.

In some embodiments, mixing may be achieved by the inclusion of a static mixer in the reactor following inlet port 504. Additionally or alternatively, mixing may also be conducted with traditional stifling techniques prior to introduction into reaction coil 512. The application of positive pressure in this first step may enrich volatile oxidation agents in the liquid phase, and prevent them from degassing. This may increase oxidation efficiency while extending the contact time of the oxidizing agent with the wastewater; even when in a chemically unfavorable, slightly acidic pH environment.

In some embodiments, in an additional oxidation step, the wastewater may exit reaction coil 512 and flow into a second chamber within oxidation reactor 500. The chamber may be sealed to prevent the escape of fumes or other oxidation by-products. Extensive aeration of the wastewater may be achieved with the introduction of air through air inlet port 504 into oxidation vessel 502 via a pump. Potentially cracked contaminants may be further oxidized by the oxygen in the air while a scrubber system, operatively connected to oxidation vessel 502 via exhaust port 510, is used to control degassing and remove toxic fumes and/or volatile oxidation by-products. This step may also effectively strip out excess oxidant from the now oxidized wastewater, cleansing the wastewater and minimizing any fouling or other contamination of the ion exchange resins later in the system.

In some embodiments, integrated with oxidation vessel 502 may be an excess chlorine removal chamber. With the air stripping approach, excess chlorine may be removed from the now cyanide free rinse water solution to avoid damage of the ion exchange resin. The chlorine may be safely transferred through exhaust port 510 and trapped in a caustic scrubber. The saturated scrubbing solution may be potentially re-injected as an oxidation agent in oxidation tank 502.

In some embodiments, reaction coil 512 may be pressurized and may further prevent early degassing of the reaction fluid. Reaction coil 512 may allow extended reaction time at a pH below 8, which may assist in preserving the target metals in solution while destroying cyanide and organic additives.

Referring again to FIG. 6, an additional embodiment depicting oxidation reactor 600 is provided. Oxidation reactor 600 may further include excess chlorine removal chamber 614. In this embodiment, two discrete treatment chambers, namely oxidation vessel 602 and excess chlorine removal chamber 614 are provided adjacent one another. Reaction coil 612 is provided within oxidation vessel 602 affixed to inlet port 604, which may be configured to provide rinse water from the plating operations and/or acid and hypochlorite. Oxidation vessel 602 may be configured to provide an extended reaction with active chlorine at a pH of approximately 4-6.5. Excess chlorine chamber 614 may be configured to scrub excess chlorine from the treated solution using aeration or similar techniques. In some cases, the low pH may be necessary to maintain the solubility of the target metal salts.

Figure 7:
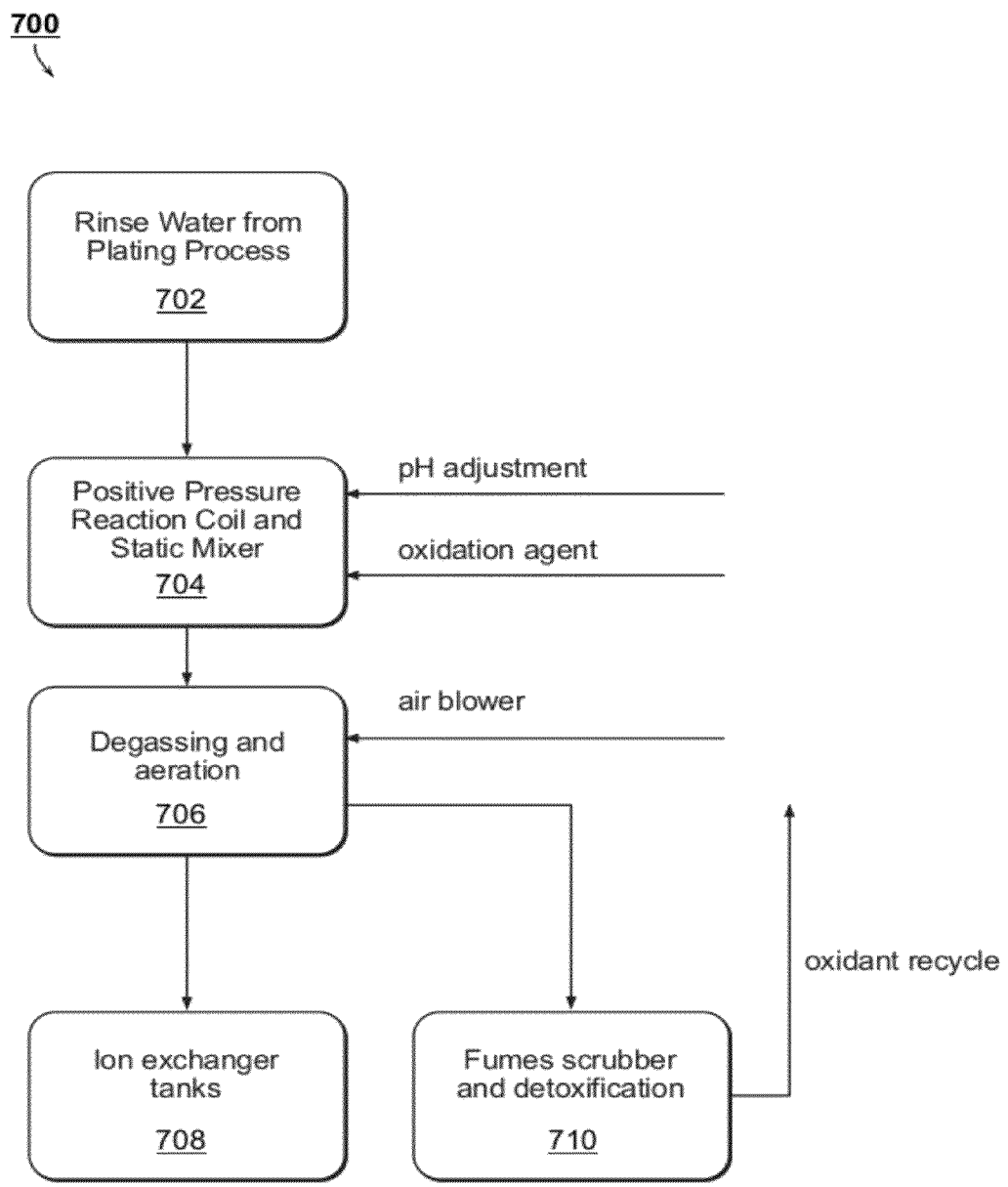
FIG. 7 is an exemplary embodiment of a wastewater system in accordance with the present disclosure.

Referring now to FIG. 7, a flowchart 700 depicting operations associated with an oxidation reactor of the present disclosure is provided. Operations may include storing and/or receiving rinse water from the plating process at a buffer tank (702). Operations may further include utilizing a positive pressure reaction coil and static mixer associated with the oxidation reactor (704). Here, an oxidation agent may be added and a pH adjustment may occur. Degassing and aeration may be performed, e.g., using an air blower or other suitable techniques (706). The effluent may be received at the ion exchange tanks (708) and any exhaust fumes from the oxidation reactor may be sent to a scrubber for detoxification (710). This is merely one exemplary set of operations as numerous other operations are also within the scope of the present disclosure.

Figure 8:
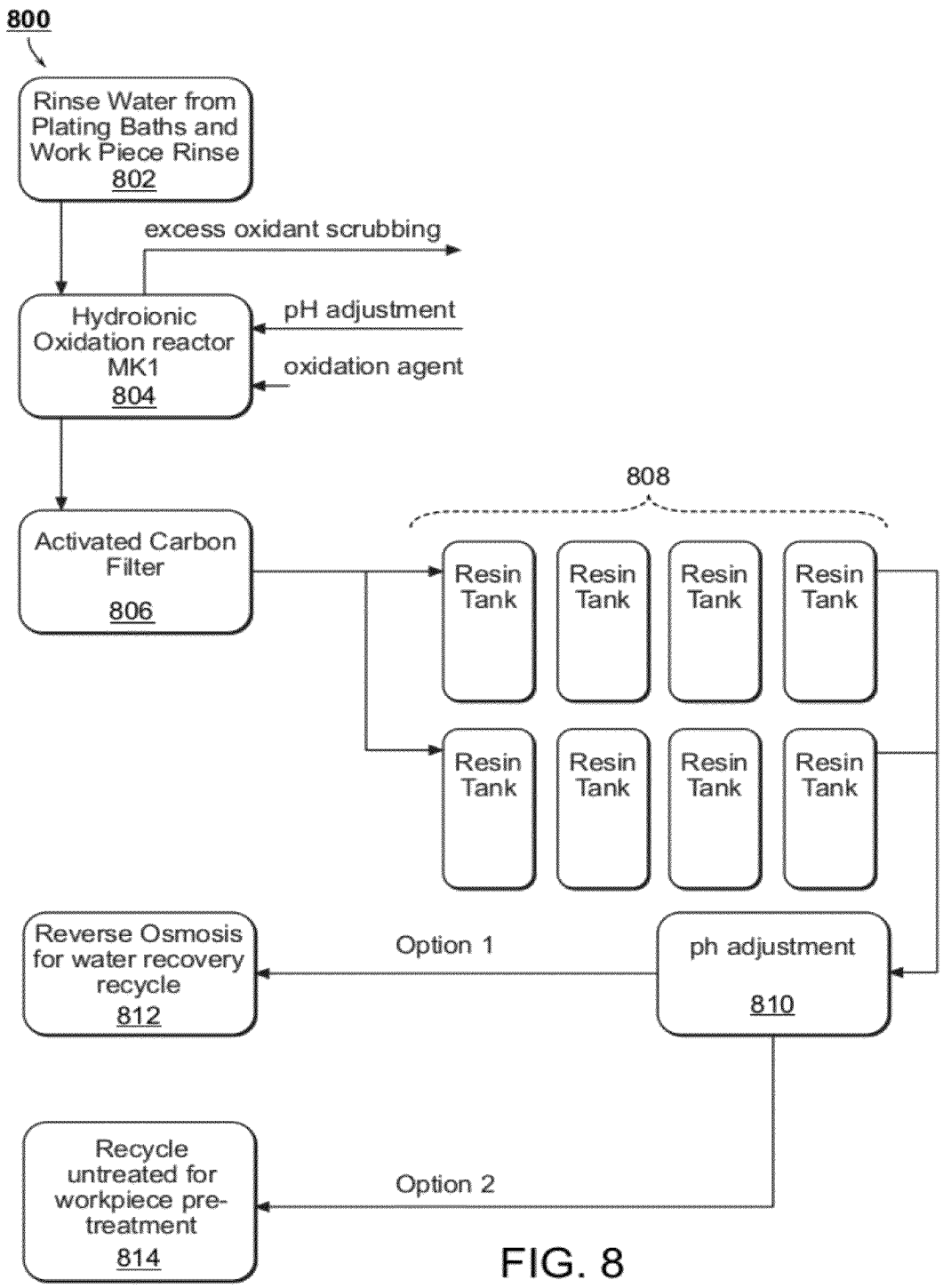
FIG. 8 is an exemplary embodiment of a wastewater system in accordance with the present disclosure.

Referring now to FIG. 8, a flowchart 800 depicting operations associated with systems and methods of the present disclosure is provided. Operations may include receiving and subsequently storing rinse water from plating baths (802). Operations may further include oxidation operations such as those described above with reference to FIG. 7 (804). Operations may further include filtering (806), via an activated carbon filter prior to providing wastewater to resin tanks (808). The remaining water may undergo a pH adjustment (810) prior to undergoing reverse osmosis for water recovery/recycle (812) or additionally or alternatively, being recycled untreated for workpiece pre-treatment (814). Upon exiting the front end system, the treated water may be ready for recycling onsite, or to be discharged in compliance with applicable regulatory discharge guidelines. While non-regulated substances may be disposed of onsite, the metal bearing ion exchange tanks may be sent to a central processing facility for resin regeneration, as well as processing and recycling of the metals. This is merely another exemplary set of operations as numerous other operations are also within the scope of the present disclosure.

Central Processing

Central processing facility may serve as the collection and processing point for saturated or partly saturated ion exchange (resin) tanks from the front end system. At the central processing facility, the ion exchange tanks from the front end system may be regenerated for reuse and the metals may be recovered in a process consisting of multiple stages including, but not limited to, ion exchange tank stripping and resin regeneration, metals separation and purification, and final processing of recovered metals into end products.

In some embodiments, the exhausted and loaded resin tanks, e.g., resin tanks 302A-G, may arrive at the central processing facility and are unloaded. The resin may be removed from the tanks and acid treated in a batch process. The acid may remove the metals collected on the resin and, combined with the rinse water, provide the loading solution for the isolation and purification unit described below. The acid may also return the ion exchange resin into its proton form.

In some embodiments, it should be noted that iminodiacetic ion exchange resins in their proton form may be used. This may minimize the use of chemicals and rinsing water requirements. A savings of approximately 20% chemical costs and 50% of rinse water may be achieved using this approach. Use of the chelating ion exchange resin in a proton form may assist in conserving tremendous amounts of caustic, brine and especially rinse water. Moreover, there is a significant benefit in preventing the resin from swelling while washing and regenerating with caustic (e.g., high pH values of approximately 10-14). The swelling may occur as a result of a volumetric expansion of the cross linked poly styrene backbone. This swelling and the subsequent contraction at a low pH is one of the major reasons for resin attrition. Therefore, avoiding high pH values in which the resin is operating may increase the life time of the material.

In some embodiments, at the site where the front end system is installed, saturated ion exchange tanks, e.g., 302A-G, may be exchanged for freshly reconditioned ion exchange tanks and then transported back to the central processing facility. Where economic, regulatory, or other considerations so merit, the central processing facility may be located at the same site as the front end system, which may eliminate the need for handling and transportation of the ion exchange tanks from the front end system. Additionally and/or alternatively, the central processing facility may also have a front end system installed such that the process waters used in the various stages may also be treated and recycled into the process, further reducing costs and chemical consumption.

In some embodiments, and as discussed above with reference to FIG. 3, portions of the front end system may include RFID tracking. For example, upon arriving at the central processing facility, the ion exchange tanks may be sorted and grouped based on data received from their respective RFID tags. The grouping may allow for the most efficient processing of ion exchange tanks, for example, tanks exhibiting similar characteristics. More specifically, regarding the metals they contain and their relative concentrations. Database software may be configured to analyze the operational histories of the incoming ion exchange tanks (based upon their RFID identifications) and suggest optimal processing parameters to the operators. This categorization and sorting process may improve the efficiency of the facility by leveling out the varying input variables from different front end collection sites. This, in conjunction with the pooling of recovered metals into homogeneous volume batches reduces the range and number of variables of each batch, simplifying processing and reducing costs.

Figure 10:
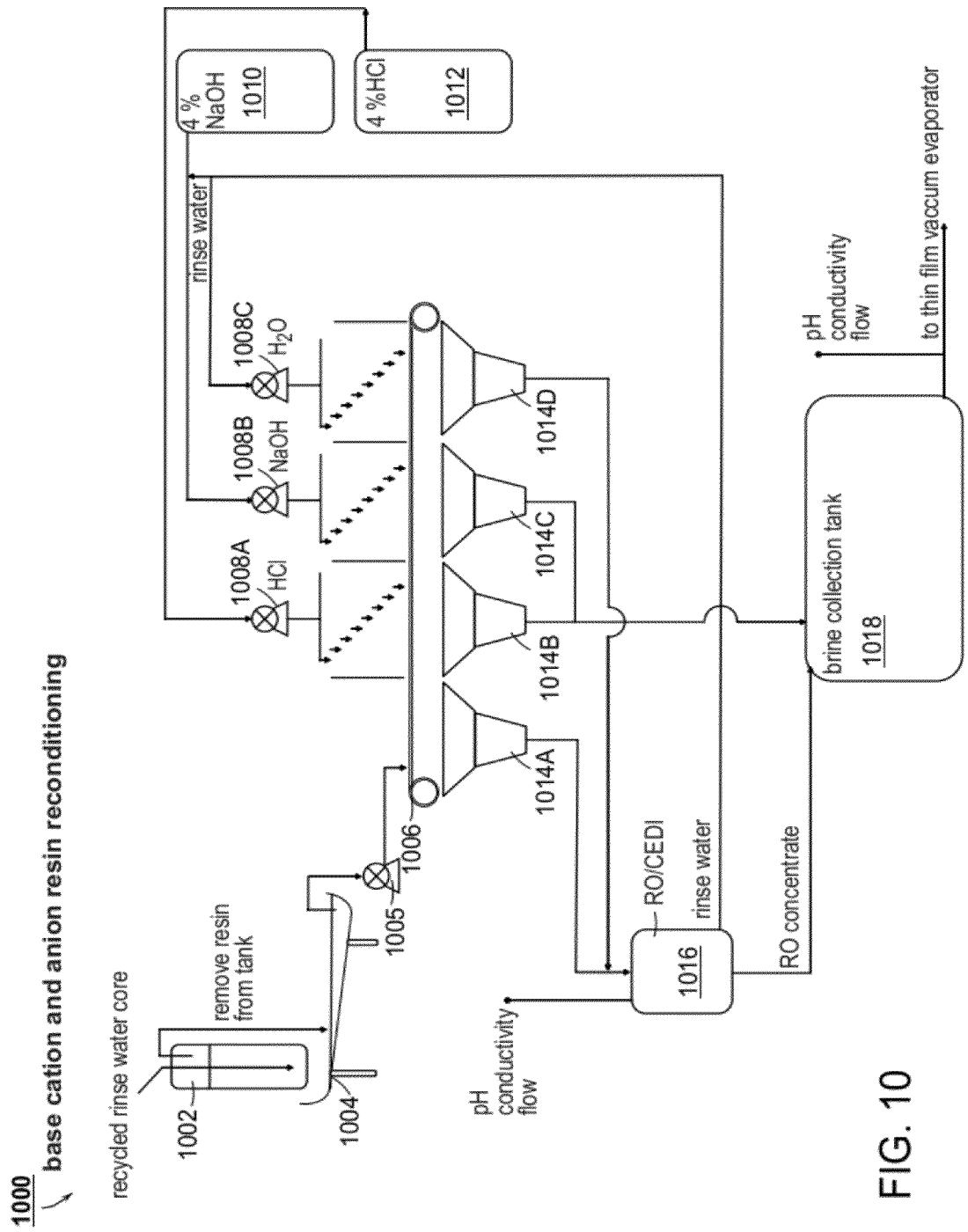
FIG. 10 is an exemplary embodiment of a wastewater system in accordance with the present disclosure.

Referring now to FIG. 10, one exemplary embodiment of a conveyor belt vacuum filter band stripping and regeneration system 1000 is provided. System 1000 may be located at the central processing facility, which may be located on or offsite from the front end system. System 1000 may utilize a cascading arrangement, which may reuse lesser contaminated rinsewater in a repetitive manner to help minimize overall rinsewater consumption and provide a high degree of control over the composition and characteristics of the regenerant. This may also result in a more efficient use of chemical inputs, thus lowering operational costs.

In some embodiments, system 1000 may be configured to receive one or more saturated ion exchange tanks 1002 from the front end system. System 1000 may perform a stripping and regeneration process in order to recover the captured metals and recondition the resins to their original state.

In some embodiments, a saturated ion exchange tank 1002 may be received at system 1000. The ion exchange resin may be removed from ion exchange tank 1002 and placed in resin holding vessel 1004. The resin may be extracted from each ion exchange tank 1002 using any suitable technique, for example, using high velocity water jets. This procedure may effectively rinse the resin to remove any trapped particulates or solids, and also fluidize the resin to counteract any compaction of the resin beds which may have occurred during the loading stage of the front end process.

In some embodiments, once the resin has been fluidized, resin slurry pump 1005 may be used to transfer the resin from holding vessel 1004 to vacuum filter band 1006. The operational parameters of slurry pump 1005 may be controlled via a PLC associated with a control panel, which may be similar to that shown in FIG. 2. It should be noted that some or all of the components of system 1000 may be controlled via a PLC similar to that described above with reference to FIG. 2. The fluidized resin, in a slurry form, may then be spread onto vacuum filter band 1006.

In some embodiments, vacuum filter band 1006 may be constructed out of any suitable material. For example, filter band 1006 may be a porous material such as a mesh, which may be configured to receive a negative pressure or vacuum in order to dewaterize or partially dewaterize the resin on the band. Vacuum filter band 1006 may be located as part of a controllable (e.g., manually or automatically using control systems known in the art) conveyor belt type, or alternative, system, which may allow filter band 1006 to pass through discrete process zones, which may include but are not limited to, washing, rinsing, and stripping zones. Vacuum filter band 1006 may include one or a plurality of bands, which may pass through the process zones. For example, in some embodiments, one vacuum filter band may pass through each individual zone. The rate at which the resin slurry is pumped onto vacuum filter band 1006, as well as the rate of movement of vacuum filter band 1006 itself may be automatically or manually altered as necessary.

In some embodiments, spray nozzles 1008A-C may be positioned adjacent vacuum filter band 1006 and configured to distribute water, acids, and other treatment agents. For example, spray nozzle 1008A may be positioned above vacuum filter band 1006 and may be operatively connected to hypochloric (HCL) acid storage chamber 1012. Spray nozzle 1008A may be configured to dispense HCL to vacuum filter band 1006. Similarly, spray nozzle 1008B may be operatively connected to NaOH storage chamber 1014 and may be configured to dispense NaOH to vacuum filter band 1006. Spray nozzle 1008C may be operatively connected to rinse water storage chamber 1016 and may be configured to dispense rinse water to vacuum filter band 1006. Each spray nozzle may be connected to one or more pumps, which may control the rate of flow out of spray nozzles 1008A-C.

The embodiment shown in FIG. 10 may provide an extremely high level of operational flexibility and control over each individual treatment parameter. For example, the depth of the resin cake may be determined by the loading speed of the resin slurry onto moving vacuum filter band 1006. The treatment and/or exposure time of the resin in a particular process zone may be determined by the speed of a particular vacuum filter band. Further, the extraction volume may be precisely controlled by varying the flow rate of the agents (e.g., water, acids, etc.) sprayed by nozzles 1008A-C onto the resin cake on vacuum filter band 1006. Drying of the resin and fluid recovery may be regulated by the level of the vacuum (or negative air flow) applied. In addition, the drying of the resin and the discrete separation of each process zone prevents any uncontrolled overlapping of each treatment step. Vacuum filter band 1006 may be operatively connected to a number of collection chambers 1014A-D.

In some embodiments, collection chambers 1014A-D may be configured to receive liquids and/or solid material from vacuum filter band 1006. For example, each collection chamber may apply a negative pressure to band 1006 to assist in dewatering the resin slurry. In some embodiments, system 1000 may include collection chamber 1014A configured to receive water extracted from the resin slurry and provide that water to rinse water storage chamber 1016. In some embodiments, rinse water storage chamber 1016 may include a reverse osmosis unit, which may be used to manage the quality of the polisher stage.

In some embodiments, spray nozzles 1008A-B may be configured to spray diluted acid or other metal removing chemicals onto the resin cake in order to mobilize and remove transition metals trapped on the resin, the resulting acid may be collected in collection chambers 1014B-C as a mixed metal regenerant. Collection chambers 1014B-C may provide any remaining liquids to brine collection tank 1018, which may provide an output to the system shown in FIG. 14. Spray nozzle 1008C may be configured to reuse the water recovered from collection tank 1014A, the resin may be rinsed to remove any residual acid from the previous zones. The resin may be given a final rinse using fresh water. The water collected in this zone may then be recycled into one or more of the initial stages (e.g., ion exchange tank 1002, holding vessel 1004, vacuum filter band 1006) and used to extract, rinse, and fluidize the resin.

Once the resin has received its final rinse, the resin may now be stripped of transition metals, reconditioned in its acid (proton) form, and after undergoing a quality control check, may be ready for reloading into front end ion exchange tanks for reuse at the front end site. Several variations of the embodiments described herein may be employed based upon the characteristics of the resin to be processed.

In some embodiments, after a certain number of reuses, the process waters used in the initial stages for rinsing and backwashing may be sent to an onsite front end system for treatment and continued reuse, for example, system 102, 200, and/or 300. The removal of any trace metals and/or other contaminants may allow the process water to be recycled and reused repeatedly. This drastic reduction in water consumption is a substantial improvement and may significantly reduce the cost of the process.

Alternatively, the front end ion exchange tanks may be stripped and regenerated in a more traditional process. In such a process, the resins may be left inside the ion exchange tanks and may be back flushed with water to remove any trapped particles and solids. This may also fluidize the resin bed and counter any compaction that may have occurred during the loading stage of the front end system. The resins can also be extracted from each individual front end ion exchange tank using pressurized water and collected in a larger column for processing as a batch. Upon completion of the first stage processing and reconditioning, batch processed resins may be reloaded into individual front end ion exchange tanks for reuse at the front end site.

In some embodiments, after rinsing, acids may then be used to strip the captured metals from the ion exchange resins and to recondition the resins to their original proton form. This regeneration procedure may result in an acidic, mixed metal solution while the stripped and reconditioned columns are quality checked for proper reconditioning and then sent back for reuse in the front end system.

Referring again to FIG. 10, in operation, the resin may be removed and rinsed with high velocity water streams from the resin tank and then consequently exposed to recycled rinse water and reconditioning acids. The contamination or metal loading levels may be configured to run in a gradient situation against the resin stream. This may be achieved by loading the resin after the removal from the tanks onto vacuum band filter 1006. Vacuum filter band 1006 may then forward the resin through various spraying zones where the different agents and rinse waters are applied. In this way, the resources may be utilized as efficient as possible with great economic benefits to the operation of the plant.

Once the target metals and contaminants have been collected in a concentrated surge tank, the metal of highest affinity to iminodiacetic ion exchange resin may be removed in a multiple (e.g., 4 or 6) column setup. Again, the present disclosure may use the selectivity of a functional group to collect specifically valuable transition metals. For example, as copper has the highest affinity in this example, the first metal to be removed and purified may be copper sulfate. This may be achieved by a controlled overloading of the first resin tank in the setup. Overloading the first resin tank may result in a pure or substantially pure copper loading in that tank. The following resin tanks may be linked in a serial fashion, so that the so called primary column can now move out of the series and undergo the copper sulfate harvesting with diluted sulphuric acid. The formerly secondary column now may undergo the same loading process until it has reached a pure or substantially pure copper loading. This process is relatively easy to control as the loading time is a simple function of copper concentration and volume pumped over the resin.

Figure 11:
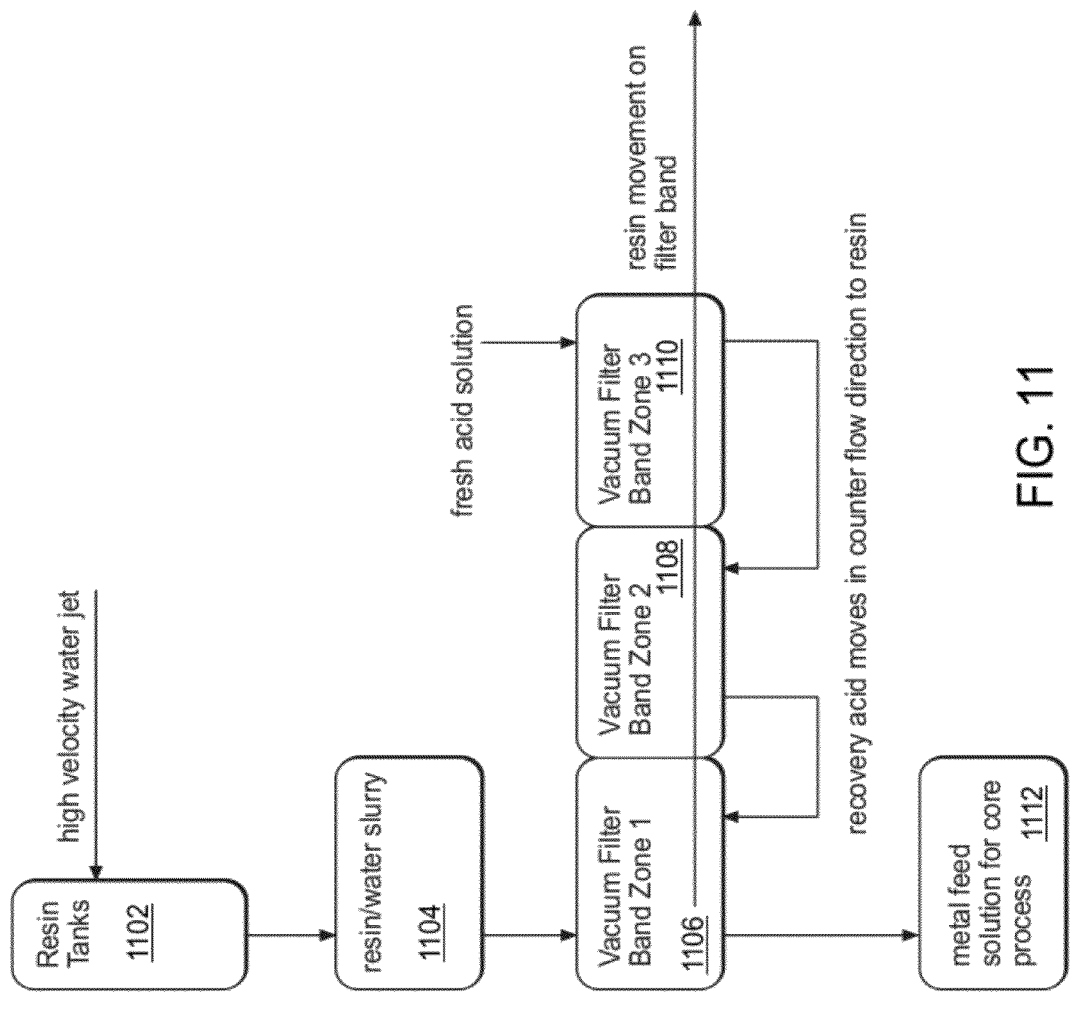
FIG. 11 is an exemplary embodiment of a wastewater system in accordance with the present disclosure.

Referring now to FIG. 11, a flowchart 1100 depicting operations consistent with stripping and regeneration system 1000 of the present disclosure is provided. Flowchart 1100 may include receiving the ion exchange (resin) tanks from front end system (1102). Operations may further include removing the resin from the ion exchange tanks and generating a resin/water slurry (1104). Operations may further include providing the resin/water slurry to a vacuum filter band having three distinct zones (1106, 1108, 1110). Resin may move from zone 1, to zone 2, to zone 3, and the recovery acid may move in an opposing direction to the flow of the resin, i.e., zone 3 to zone 2 to zone 1. Operations may further include providing the resin back to the front end system and providing the metal solution for enrichment (1112), which is discussed in further detail below.

Figure 12:
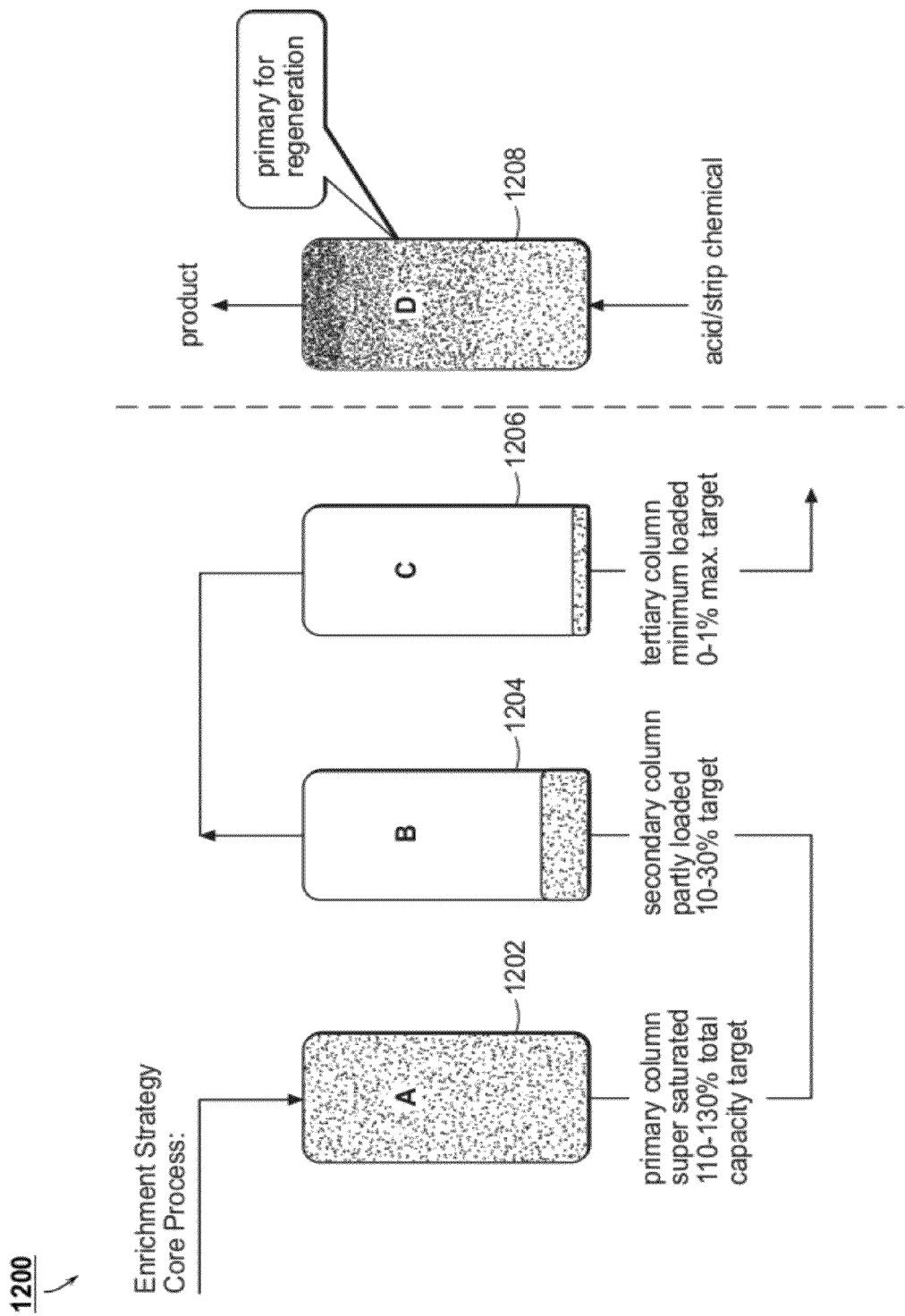
FIG. 12 is an exemplary embodiment of a wastewater system in accordance with the present disclosure.

Referring now to FIG. 12, an embodiment of a metal specific purification system 1200 is provided. Here, the mixed metal strip solution, or regenerant, from the system of FIG. 10 may be adjusted and controlled to the necessary pH levels (if required) and then pumped into a series of chelating ion exchange resin purification units, as shown in FIG. 12.

In some embodiments, system 1200 may include a plurality (e.g. 4 or more) of purification units (e.g., resin tanks), which may utilize selective, chelating ion exchange resin or silical gels. The arrangement may be designed to achieve continuous flow of the re-conditioning solution through system 1200. For each target metal, one or more extractor units may be employed. In the particular embodiment depicted in FIG. 12, three or more purification units are loaded with the reconditioning solution in series. This results in primary purification unit 1202, secondary purification unit 1204, and tertiary purification unit 1206. Other configurations and numbers of tanks are also within the scope of the present disclosure. In addition to trapping and retaining a preferred metal in each purification unit or resin tank, system 1200 may also successfully purify and isolate a particular target metal. The enriched and purified target metal, as it is absorbed on the resin in the purification units, may then be harvested as described below with reference to FIGS. 13-14.

In operation, once a purification unit goes offline, the previously secondary purification unit may be switched into the flow path as the primary purification unit. Being already enriched partly, it may experience oversaturation quickly and purify the trapped metal accordingly. This may be an ongoing process where the purification units are switched into the flow path upstream. This may allow for the operation of a limited number of purification units continuously.

Table 1, provided below, depicts one particular embodiment of the operation of metal purification system 1200 of FIG. 12. Once primary purification tank 1202 has been supersaturated, the vessel may be rinsed or blown empty and switched to regeneration mode. The former secondary purification tank 1204 may now be switched into the primary position and the former tertiary tank 1206 may now go into the secondary position and the regenerated tank 1208 may now switch into the tertiary position. The supersaturation may ensure the displacement of lower affinity metals (depending upon mixed metals composition and ion-exchange ligand) by the highest affinity metal. In this way, purities of approximately 99% of the target metal may be achieved (e.g., S930, TP207, SIR-1000).

TABLE 1

| | Primary | Secondary | Tertiary | Regeneration |
|---|---|---|---|---|
| 1 | A | B | C | D |
| 2 | D | A | B | C |
| 3 | C | D | A | B |
| 4 | B | C | D | A |
| 5 | A | B | C | D |

In some embodiments, purification units 1202, 1204, 1206, 1208 may each contain selective ion exchange resins and the units may be arranged in the rotating configuration described in Table 1. This system may be configured to selectively target and capture an individual metal by using supersaturation to leverage the inherent relative affinity of the resin to different metals.

In some embodiments, during supersaturation, regenerant may be continually introduced into first purification unit 1202 even after the effective capacity of the resin has been exhausted. As the target metal of a particular purification unit may have a higher affinity to the resin, relative to the other metals in the solution, continued exposure of the resin to the regenerant may cause the higher affinity target metal ions to dislodge and replace other non target metals which may have been captured on the resin. After a designated volume of supersaturation, the resin of a particular purification unit may contain only the metal targeted by that module. Some or all other metals not targeted by that purification unit may remain in the regenerant solution and continue to the next purification unit, where the same process then targets and captures another metal. Depending on the number of metals in the regenerant from the front end resin tanks, a corresponding number of purification units each targeting a specific metal may be arranged in series such that all the metals may be separated. In this manner, the individual metals of a mixed metal regenerant may be identified, targeted, separated by capture on the resin, and purified.

It should be noted that the ability to separate individual metal fractions from a multi-metal regenerant represents a drastic improvement over existing ion exchange processes as purified metals can be directly manufactured into end products. Currently, processes involving mixed metal solutions require additional and costly processing before usable products can be recovered.

In some embodiments, the regenerant from FIG. 12 may now be cleansed of metals and may effectively be an acid again, albeit at lower strength and concentration, and with trace contaminants. The ion exchange process of FIG. 12, in which metals in the regenerant are exchanged for protons on the resin, also has the additional effect of regenerating the regenerant (acid) itself by the addition of free H+ ions (from the ion exchange resin). Upon exiting system 1200, the regenerant may be infused with a small volume of fresh, highly concentrated acid in order to restore its strength and concentration to near original levels. In this manner, the regenerant can then be recycled back into other systems (e.g., system 1000) several times and used to strip and recondition incoming front end columns. The ability to repeatedly reuse acid in this fashion is a significant improvement over existing ion exchange processes; in which acid consumption constitutes a large percentage of operating costs and the need to discard large amounts of waste acid creates a liability.

In some embodiments, once a primary purification unit (e.g. primary purification unit 1202 in FIG. 12) has reached supersaturation and is fully loaded with a target metal, it may be taken offline and readied for stripping and regeneration. The purification unit may be back flushed with water to remove any interstitial fluid, residual loading solution, solids and impurities, as well as to fluidize the resin bed and to counter any compaction. The process waters from this stage may also be sent to an onsite or offsite front end system for treatment and recycling. The repeated reuse of this process water may constitute a significant decrease in water consumption and operating costs when compared to existing ion exchange processes.

Figure 13:
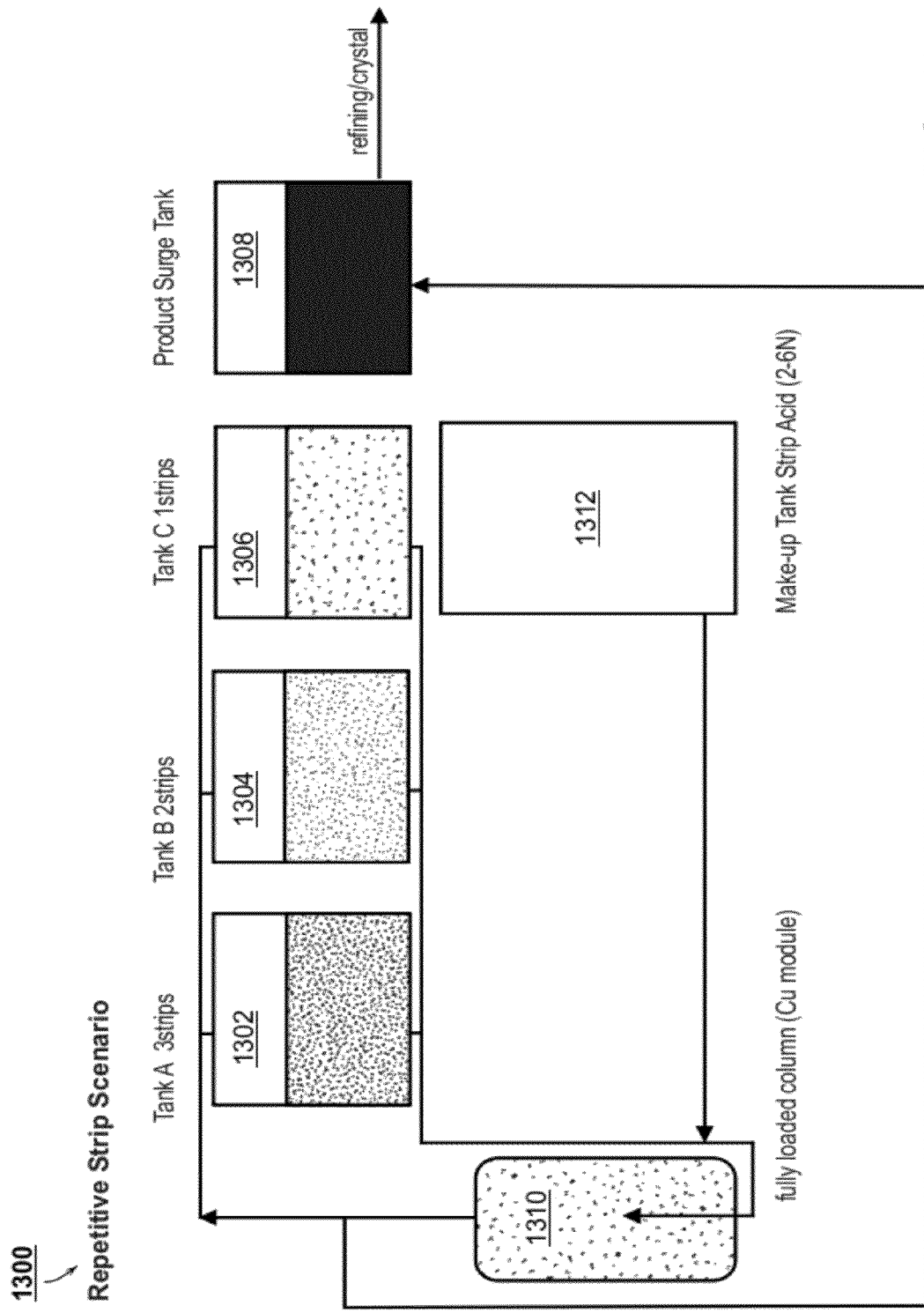
FIG. 13 is an exemplary embodiment of a wastewater system in accordance with the present disclosure.
Figure 14:
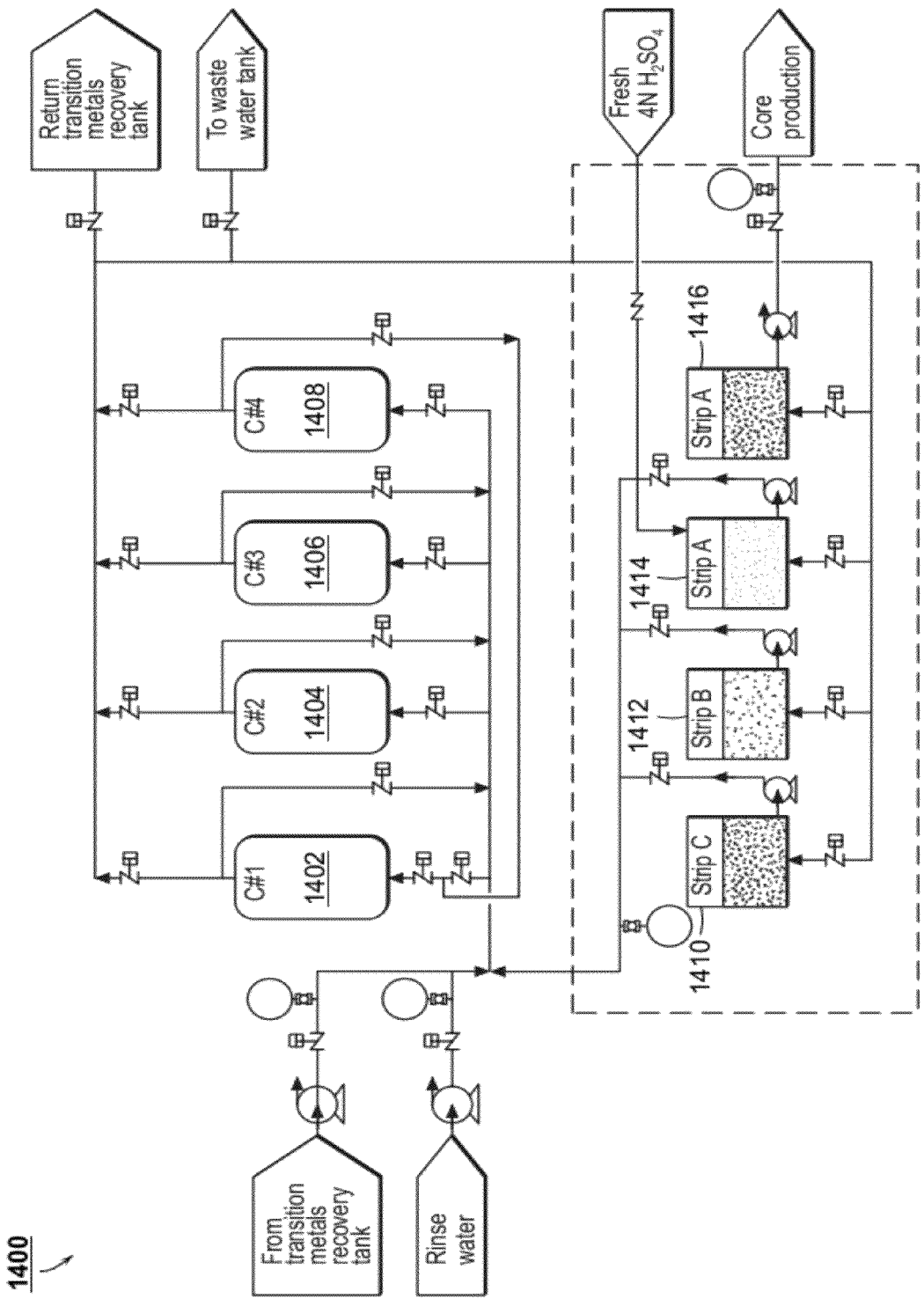
FIG. 14 is an exemplary embodiment of a wastewater system in accordance with the present disclosure.

Referring now to FIGS. 13-14, embodiments depicting a repetitive stripping system 1300 are provided. As discussed above, the ion exchange tanks from the front end system may be stripped with vacuum filter band 1006 associated with system 1000. In contrast, the metal filled purification units from FIG. 12 may be stripped using repetitive stripping system 1300. System 1300 may utilize a repetitive stripping protocol regulated by an automated concentrate management system based on a programmable logic controller.

In some embodiments, system 1300 may include a series of acid tanks, for example, acid tank A 1302, acid tank B 1304, and acid tank C 1306. A fully loaded purification tank or column 1310 may be provided from system 1200 shown in FIG. 12. Fully loaded column 1310 may receive additional acid from make-up strip acid tank 1312 and may provide an output to product surge tank 1308. In one possible sequence, acid tank A 1302 may be pumped through fully loaded column 1310, feeding into tank 1308 (final product, product surge tank) (step 1). Acid tank B 1304 may then be pumped through column 1310 (step 2), followed by acid tank C 1306 being pumped through column 1310 (step 3). Fresh diluted acid may then be pumped through column 1310 (step 4). After the acid treatment loaded column 1310 may undergo rinsing with water for complete regeneration. Step 1 may empty into product surge tank 1308, step 2 may empty into acid tank A 1302, step 3 may empty into acid tank B 1304, and step 4 may empty into acid tank C 1306.

In some embodiments, each batch of acid may be used to strip several different purification units and each purification unit may be stripped by a series of acid batches of decreasing metal and increasing free proton concentration. Consequently, the first batch of acid to be introduced into a saturated purification unit (e.g. column 1310) may be that which has already been used the most times relative to the other batches within a set of acid batches. Upon exiting the purification unit, this acid batch may have its maximum metal and minimum free proton concentrations respectively. At that point, the acid batch may be removed from stripping system 1300 and sent for final processing into end products.

Figure 15:
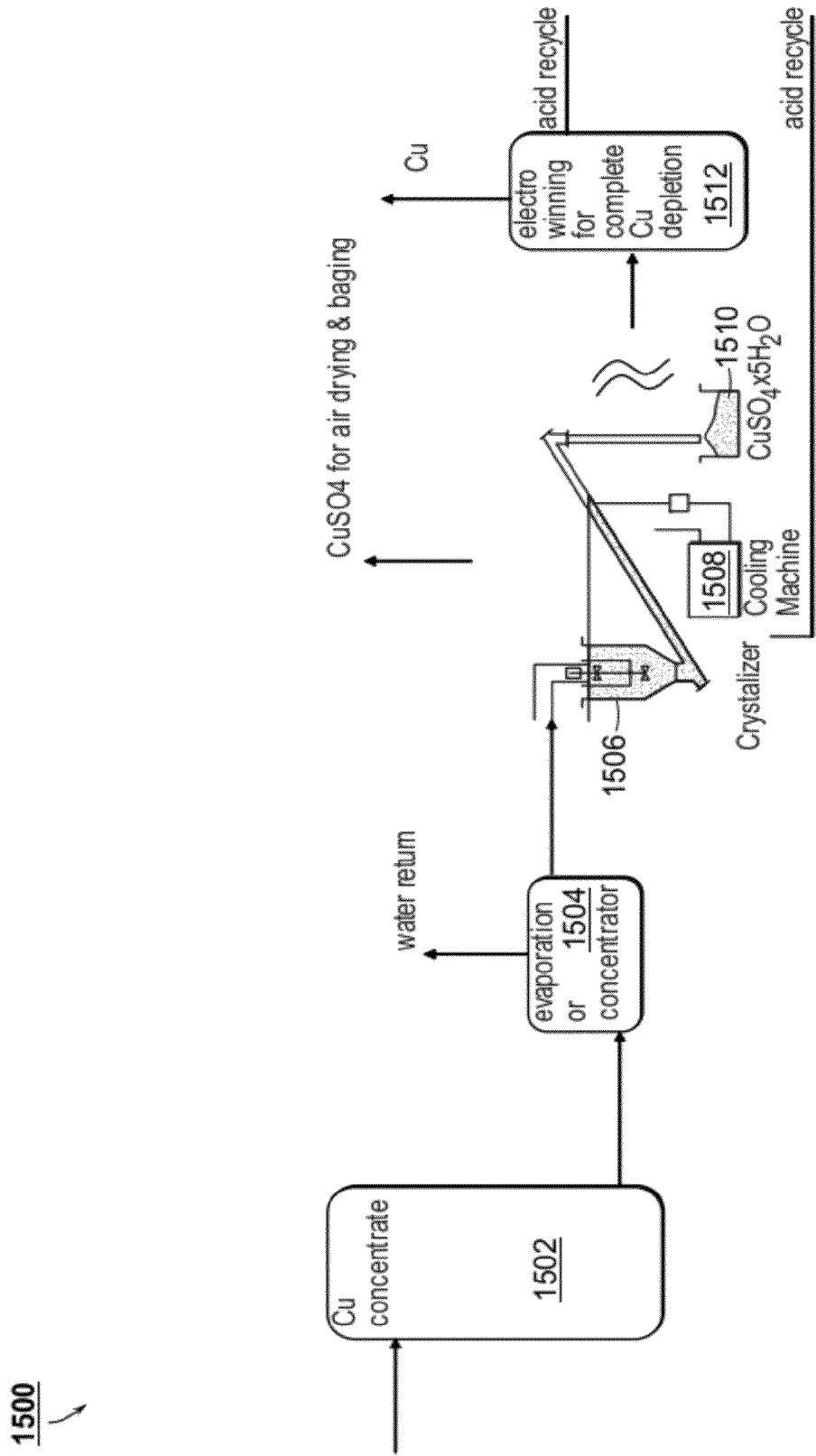
FIG. 15 is an exemplary embodiment of a wastewater system in accordance with the present disclosure; Like reference symbols in the various drawings may indicate like elements.

In some embodiments, the stripping process may continue in this fashion with each subsequent acid batch having been used one fewer time than the batch preceding it. Other than the first batch, which may be sent to for final processing into end products, all other batches may be stored for use with the next saturated column. The final batch of acid may be fresh acid, to insure that the resin is adequately stripped of metals and properly regenerated and reconditioned for reuse. For example, referring again to FIG. 13, in a four batch set of acids, consisting of a three strip batch in acid tank 1302, a two strip batch in acid tank 1304, a one strip batch in acid tank 1306, and a fresh acid batch in tank 1312, the three strip batch may be used first, and then sent for final processing into end products as shown in FIG. 15. Then, the two strip batch may be used, which may become the three strip batch for the next column. The one strip batch may then be used, and may then become the two strip batch for the next column. Finally, the fresh acid may be used and may become the one strip batch for the next column.

In some embodiments, this stripping protocol may markedly decrease chemical consumption by maximizing the utilization of free acid. This may provide a substantial advantage over existing ion exchange processes that may generate large volumes of waste acids requiring additional treatment and disposal. As a result, less acid may be consumed, which may constitute a significant operational cost.

In some embodiments, the high purity and concentration of the metal may allow for the regenerant to be directly and economically processed into a metal salt chemical end product, with little or no byproducts or wastes. In this manner, the columns or resin tanks may be stripped and regenerated for reuse and the target metal may be rendered as a high purity, highly concentrated metal salt solution. This process may be a significant improvement over existing ion exchange processes in that the acid may not be consumed and discarded as a waste, but rather becomes an ingredient of a commercially salable end product. This may result in substantially lower operating costs, as well as in eliminating the costly requirement for handling and disposing of waste acids.

Referring now to FIG. 14, an exemplary embodiment of a system 1400 incorporating some or all of systems 1200 and 1300 is provided. System 1400 may include purification units 1402, 1404, 1406, and 1408, which may be configured similarly to those described above with reference to FIG. 12. System 1400 may further include acid tanks 1410, 1412, 1414, and 1416, which may be configured similarly to those described above with reference to FIG. 13. Alternative arrangements of purification units and acid tanks are also within the scope of the present disclosure.

In some embodiments, system 1400 may be used to recover metal sulfates from iminodiacetic ion exchange resins by utilizing a repetitive stripping system such as that described above with reference to FIG. 13. The application of a concentration gradient in the stripping acid may allow for an efficient utilization of the provided protons as well as in minimizing rinse water requirements and complex process controlling.

In some embodiments, system 1400 may be used to apply the acid used to recover the pure metal ions from the ion exchange resin in a multiple and repetitive fashion. Further, it always follows with an exposure of less used acid, which means the reconditioning and cleaning may become more and more efficient in the ongoing process. In addition, residual free protons may be minimized in the final, highly concentrated metal sulfate solution. This feeds perfectly into the crystallization process (discussed in FIG. 15) following the metal sulfate recovery as the solubility is significantly decreased in the increased pH environment.

In some embodiments, the multiple acid exposure via tanks 1410, 1412, 1414, and 1416 also simplifies the rinsing of the resin after the acid treatment. In this way, less copper (or other metals) may be left remaining on the resin. As a result, issues regarding when to cut the recovery fraction and to switch to rinsing may be eliminated. In traditional column reconditioning approaches, the metal concentration in the effluent may be slowly increasing to a maximum (desired) concentration and then decreasing during the ongoing. All this solution typically may be collected into one tank. This introduces a dilution effect which is counterproductive to the desire receiving highest metal recovery concentrations (i.e. 100-150 g metal salt per liter). In the described, repetitive exposure of the same saturated column to pre-defined, pre-concentrated recovery solutions, these low concentration fronts and tails of the column wash are avoided and overcome. The last column exposure to fresh diluted acid provides a perfect scenario to rinse the column acid free with fresh or recycled rinse water before it switches back into the enrichment train. This simplification makes the recovery process order more efficient.

In some embodiments, while the columns in the core process may be connected in series, the first column (e.g., purification unit 1402) in line (or the primary columns) may be supersaturated with copper ions. The copper ions, in this particular example, may remove all lower affinity metal ions.

In operation, the primary column may then be taken out of the system once all ion exchange sites have been occupied by the target metal, for example, the copper ions discussed above. The primary column may now move into the concentrate manager section of system 1400, namely, acid tanks 1410, 1412, 1414, and 1416. Here, acid solution which has already been exposed to two primary columns may be pumped first over the column to receive a highly enriched, low remaining free proton solution indicated by acid tank 1416, i.e., strip D. The column may then be treated with further acid rinses from acid tank 1412 (i.e., strip B) and acid tank 1414 (i.e., strip A) until fresh acid solution is pumped over the column. All of the copper may now be removed and the primary column may undergo a brief water rinse. The column may then ready to return into the loading cycle.

In some embodiments, system 1400 may be configured to utilize the protons delivered by the acid as effectively as possible. System 1400 may also remove the necessity to manage the eluting high concentration peak from the column in the metal recovery process. The overall recovery process therefore provides a more robust and simplified approach providing a much better, higher concentrated and less acidic feed solution for the metal salt crystallization.

Referring now to FIG. 15, a system 1500 configured to process commercial metal salts is provided. At system 1500 the metal salt concentrates from system 1400 may be processed into commercial quality metal salts using processes, which may include, but are not limited to, vacuum evaporation, crystallization, and spray drying. The techniques employed may depend upon the desired characteristics and specifications for the product. The high purity and concentration of the concentrate may allow for very economical production of a wide range of specifications depending on customer demand. After undergoing quality checks, the end product may be packaged and shipped to customers or other distribution networks.

In some embodiments, system 1500 may include receiving vessel 1502, which may be configured to receive and/or store the output from system 1400. The metal solution may be transferred from receiving vessel 1502 to evaporating chamber 1504. Water removed from evaporating chamber 1504 may be redistributed to any of the other systems of the present disclosure. The output from evaporating chamber 1504 may be provided to crystallizer 1506, which may be operatively connected to cooling machine 1508.

In some embodiments, the metal sulfates are recovered in the central processing units as high concentration metal sulfate solutions. Crystallizer 1506 may utilize various crystallization techniques to recover the metal sulfates as solid products. This may be achieved by cooling the highly concentrated metal sulfates, which may reduce the solubility to a level where the solid metal sulfates start to crystallize. The resulting crystallized metal sulfates may be deposited in final crystallization tank 1510. The crystallized metal sulfates may then be sent to electrowinning chamber 1510. Electrowinning chamber 1510 may involve various processes used to extract the target metals. It should be noted the systems of the present disclosure may be used to produce metal salts, which may be far more lucrative than producing metallic or elemental products. For example, metal sulfates, like copper penta hydro sulfate, may be fed directly back into printed circuit board manufacturing, plating, chip manufacturing and many other processes. For copper sulfate, the recovered mass as sulfate may be approximately four times more than the pure metal. It should be noted that although FIG. 15 primarily depicts copper as the metal, the systems of the present disclosure may work with any number of metals. Some other metals include, but are not limited to, nickel, zinc, etc.

In some embodiments, the processes of the central processing facility may be monitored by sensors and computers linked into a central database software system, which may continually record all of the operating parameters, criteria, performance, and results in real time. Together with data from the front end column RFID tags, this data may be evaluated by database mining software to identify trends and optimum operating parameters for the various categories of front end columns arriving at the central processing facility. The same or similar software may also analyze operating parameters of the processes of the central processing facility. As the database accumulates information over time, it may be able to recommend optimized operating parameters for front end column sorting and regeneration, target metal module loading and stripping parameters, and overall process efficiency; further reducing costs and chemical consumption.

As discussed above, embodiments of the present disclosure may utilize an RFID tracking and management system. For example, and referring again to FIG. 3, individual ion exchange tanks 302A-G may be tracked and managed using a networked RFID (Radio Frequency Identification) system. Each ion exchange tank may be fitted with a unique RFID tag capable of recording and storing at least one characteristic associated with the tank. For the purposes of this disclosure the term "characteristic" may refer to the physical, chemical and historical characteristics of a particular ion exchange tank. A network of handheld, truck mounted, and factory based RFID readers may connect wirelessly into an asset management software system, which may be located at the central facility or elsewhere, and mirrored at corporate headquarters. This system may allow for the real time, simultaneous tracking of thousands of ion exchange tanks through every stage of the service process. This may result in maximized efficiencies for tasks such as ion exchange transportation, exchange scheduling, management of resin degradation, and categorization of like ion exchange tanks for batch stripping and regeneration. Cost savings may also be realized from the prevention of operational errors associated with incorrect column/resin identification. This historical database may be updated in real time and may operate in conjunction with a fuzzy logic based process optimization software system to continuously improve operational efficiencies.

In some embodiments, at the core process central facility for example, operational parameters such as reagent selection and dosing, resin batch composition, stripping efficiencies, and product quality may be logged and managed by a fuzzy logic based software system. This information, along with data collected from the RFID Management System may be incorporated into a unified database containing a detailed historical accounting of every operational parameter of the service process. The fuzzy logic system may continuously mine this database to identify optimally efficient parameters and present suggested process parameters to technicians. The system may "learn" from each ion exchange tank processed such that as the database grows over time, it may identify the most efficient set of parameters to process any given ion exchange tank or set of tanks. Consequently, when a truck carrying saturated ion exchange tanks enters the central facility, and before the driver has even turned off the engine, the system will know exactly what ion exchange tanks have arrived, which client each ion exchange tank is from, how long the ion exchange tank was in service operation, and how they should be sorted. From the database, the system may review the historical data for each ion exchange tank, including such variables as relative metal concentrations and stripping reagents. Comparing the results from each previous set of parameters, the software may then identify the optimal set for the most efficient and cost effective processing of the ion exchange tank. The system may also apply the same processes to refining core process and product production operating parameters. The data and optimized process parameters may minimize the learning curve for new central facilities, as well as international expansion.

In some embodiments, the teachings of the present disclosure may be well suited to process the rinsewaters of the electroplating and surface finishing industries. The principal objective of electroplating may be to deposit a layer of a metal possessing a desired property, such as aesthetic appearance, hardness, electrical conductivity, or corrosion resistance, onto the surface of a material which lacks such properties. Typically the material being plated may be another metal, such as steel or zinc; though other materials such as plastic may also be plated. Parts which are plated may range from common items such as bolts, nails, buttons, and zippers, and industrial items such as engine components, turbine blades, hydraulic pistons, and aerospace components, to high tech items such as integrated circuits, data discs, and copper clad laminates used in printed circuit boards.

Electroplating, technically a process known as electrodeposition, may be achieved by turning the part to be plated into a cathode by running a negative charge through it, and then immersing that part in an electrolyte (or plating bath) composed of dissolved metal salts such as CuSO4; the metal to be plated effectively becomes the anode. In solution, the dissolved metals may exist in ionic form with a positive charge and are therefore attracted to the negatively charged parts. When a direct current, usually supplied by a rectifier, flows though the circuit, the metallic ions are reduced at the cathode (part) and plate out. As the process continues, the composition of the plating bath may change as metals are removed from solution. Consequently, baths must be maintained with the addition of supplemental ingredients. While some baths may be maintained indefinitely, others (especially where precision is required) must be periodically dumped and replaced with a fresh bath; the discharge of spent plating baths is a major source of wastewater. This is not accessible to this process without extensive bath dilution prior to processing.

Once plating has reached the desired thickness, the parts may be removed from the plating bath and may proceed through a series of rinsing tanks in a counter-flow arrangement. Fresh water may be supplied from the final tank, and fouled rinsewater from the first tank may be continually discharged. Thorough rinsing may be essential as any residual plating solutions may result in clouding, blemishes or other surface irregularities; resulting often in the use and discharge of large volumes of water. As the parts leave the plating bath, they "drag out" the plating solution still adhered to their surfaces. This dragout is one of the primary reasons why rinsewaters are so heavily contaminated by heavy metals.

In some embodiments, to process these electroplating rinsewaters and spent plating baths, a front end system may be installed on site containing a suitable volume of ion exchange resin (housed in columns or tanks) relative to the daily volume of rinsewaters and concentration of metals. Each process step may treat or remove contaminants within the wastewater, with the metals being captured in the columns.

In some embodiments, upon exiting the front end system, the treated water could then be directly recycled into the rinsing process. If the water quality requirement of the electroplating process so requires, the treated water could be further processed with a reverse osmosis or traditional demineralization system prior to reintroduction into the rinsing process. The saturated front end columns may be replaced with freshly reconditioned columns, and then sent to a central processing facility for stripping and reconditioning. The extracted metals may then undergo the separation and purification process (as described above), and then be processed into commercially salable end products. Embodiments of the present disclosure may confer the benefits of onsite wastewater recycling, as well as reclamation of metals, at a cost lower than currently available alternatives.

Embodiments of the present disclosure may utilize a multi-stage process to collect, transport, and treat wastewater having various metals. More specifically, this disclosure refers to an ion exchange based wastewater treatment and recycling system for the treatment of metal bearing wastewater, comprised of an independent front end unit located at the site of the wastewater generation, and a central processing facility where components of the front end module are collected and processed. After treatment, wastewater exiting the invention may be suitable for recycling or legal discharge, while metals are collected, separated, purified and processed into end products. As economic, regulatory, or other considerations so require, the central processing facility may also be located on the same site as the front end system.

In stage one, metals may be stripped from the resins and the resins regenerated to their original proton form by an innovative conveyer belt vacuum filter band unit (as shown in FIG. 10); which may utilize a cascading setup to minimize rinsewater consumption and enhance control over operational parameters. After extraction from their individual columns or ion exchange tanks, resin may be spread onto a filter band which travels through a number of zones, each with a discrete process step (e.g., rinsing, stripping, and reconditioning). After undergoing stage one processing, resins may be reconditioned to their original proton form and ready for reuse in front end units, while the metals may be stripped into a solution for further processing in stage two.

In stage two, the mixed metal strip solution, or regenerant, from stage one may be pumped into a series of chelating ion exchange resin purification units; each consisting of a number of columns or tanks, arranged in a merry go round configuration, and loaded with selective ion exchange resins. Each purification unit may selectively target and capture an individual metal by using supersaturation to leverage the inherent relative affinity of the resin to different metals. By arranging a number of purification units in series, individual metal fractions may be extracted from the mixed metal regenerant.

Once a column in a particular purification unit reaches supersaturation, it may then be taken offline, stripped of the metal, and regenerated using an innovative repetitive stripping process controlled by an automated concentrate manager as shown in FIGS. 12-14. In this process, each batch of acid may be used to strip several different columns and each column may be stripped by a series of acid batches of decreasing metal and increasing free proton concentration. This may result in markedly decreased chemical consumption and a strip solution of high concentration and purity. The high purity and concentration of the metal may allow for the regenerant from stage two to be directly and economically processed into a metal salt chemical end product. In stage three, the stage two single metal regenerant may be processed directly into commercially salable end products using processes such as vacuum evaporation, crystallization, and spray drying as shown in FIG. 15.

Some of the embodiments (e.g., those associated with the RFID tracking and management system) described above may be implemented in a computer program product that may be stored on a storage medium having instructions that when executed by a processor perform the messaging process described herein. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that any dimensions, sizes, lengths, dosing amounts, densities, flow rates, dosing agents, etc, are merely provided for exemplary purposes and are not intended to limit the scope of the present disclosure. For example, any dimensions or sizes listed on any of the Figures are merely provided as an example, as these sizes may be varied by persons of ordinary skill in the art.

A number of implementations have been described. Nevertheless, it will be understood that various modifications may be made. Accordingly, other implementations are within the scope of the following claims.

What is claimed is:

1. A method for treating wastewater comprising:
receiving a saturated resin tank from a front end system at a vacuum filter band system;
generating a slurry from the saturated resin tank;
providing a cascading resin rinse to the slurry;
receiving a metal-filled purification unit from a metal specific purification system at a repetitive stripping system; and
sequentially applying, at the repetitive stripping system, the contents of a plurality of acid tanks to the metal-filled purification unit to generate a metal salt.

2. The method of claim 1, wherein the plurality of acid tanks includes three acid tanks.

3. The method of claim 1, further comprising pumping at least one of an acid, an oxidant agent and a reductive agent from each of the plurality of acid tanks through the metal-filled purification unit in a pre-selected order.

4. The method of claim 2, wherein each of the plurality of acid tanks includes a different concentration of acid with varying, accumulated target metal salt levels.

5. The method of claim 1, wherein the metal-filled purification unit includes at least one of copper, nickel, zinc, and an ion exchange resin.

6. The method of claim 5, wherein the ion exchange resin is selected from the group consisting of: an iminodiacetic ion exchange resin, silica gel, chemically modified silica gel, and an inorganic support.

7. The method of claim 1, providing an output to a product surge tank via the repetitive stripping system.

8. The method of claim 1, further comprising including a most frequently used acid within at least one of the plurality of acid tanks and applying the most frequently used acid to the metal-filled purification unit first.

9. The method of claim 2, further comprising dispensing acid from a first acid tank to the metal-filled purification unit, dispensing acid from a second acid tank into the first acid tank, and dispensing acid from a third acid tank into the second acid tank.

10. The method of claim 9, further comprising receiving an effluent resulting from the first acid tank emptying into the metal-filled purification unit at a product surge tank.

11. The method of claim 1, wherein the vacuum filter band system comprises a vacuum filter band with an adjustable rate.

12. The method of claim 1, wherein the cascading resin rinse reuses contaminated rinsewater in a repetitive manner.

13. The method of claim 1, wherein the vacuum filter band comprises at least one spray nozzle to distribute at least one treatment agent.

14. The method of claim 13, wherein the at least one spray nozzle controls a rate of flow of the at least one treatment agent.

* * * * *